United States Patent
Sakagami et al.

(10) Patent No.: US 9,124,775 B2
(45) Date of Patent: Sep. 1, 2015

(54) INFORMATION PROCESSING APPARATUS, INFORMATION PROCESSING METHOD, PROGRAM, AND IMAGING APPARATUS INCLUDING OPTICAL MICROSCOPE

(75) Inventors: Junichi Sakagami, Tokyo (JP); Masahiro Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 13/035,566

(22) Filed: Feb. 25, 2011

(65) Prior Publication Data

US 2011/0216184 A1 Sep. 8, 2011

(30) Foreign Application Priority Data

Mar. 5, 2010 (JP) .................. P2010-049020

(51) Int. Cl.
H04N 7/18 (2006.01)
A61B 1/00 (2006.01)

(52) U.S. Cl.
CPC ...................... *H04N 7/18* (2013.01)

(58) Field of Classification Search
CPC ..... H04N 7/18; H04N 5/232; H04N 2101/00; H04N 5/23248; H04N 5/772; H04N 5/228; H04N 13/02; H04N 2201/0084; G06T 7/20; A61B 5/05
USPC .............. 348/79, 37, 208.2, E7.085, E5.024, 348/E7.001, 207.99, 187, 222.1, 139; 358/103, 105, 125, 903, 93; 382/154, 382/100
See application file for complete search history.

(56) References Cited

U.S. PATENT DOCUMENTS

| | | | | |
|---|---|---|---|---|
| 4,969,036 | A * | 11/1990 | Bhanu et al. | 348/113 |
| 5,841,124 | A * | 11/1998 | Ortyn et al. | 250/201.3 |
| 5,991,437 | A * | 11/1999 | Migdal et al. | 382/154 |
| 6,768,509 | B1 * | 7/2004 | Bradski et al. | 348/207.99 |
| 7,742,635 | B2 * | 6/2010 | Rohaly et al. | 382/154 |
| 7,892,165 | B2 * | 2/2011 | Nakamura | 600/117 |
| 2006/0274386 | A1 * | 12/2006 | Wakazono et al. | 358/518 |
| 2008/0062164 | A1 * | 3/2008 | Bassi et al. | 345/214 |
| 2008/0292134 | A1 * | 11/2008 | Sharma et al. | 382/100 |
| 2011/0316869 | A1 * | 12/2011 | Kariya et al. | 345/589 |

FOREIGN PATENT DOCUMENTS

DE 102006055758 A1 * 5/2008
JP 2000-350239 12/2000

* cited by examiner

*Primary Examiner* — Dave Czekaj
*Assistant Examiner* — Dramos I Kalapodas
(74) *Attorney, Agent, or Firm* — K&L Gates LLP

(57) ABSTRACT

An information processing apparatus is provided and includes: a first storage section to store coordinates of luminance change points in a calibration pattern having a luminance distribution in two axis directions orthogonal to each other; a generation section to generate standard pattern information on a luminance distribution of a calibration image; a determination section to determine coordinates of a luminance change point of the calibration image, as coordinates of a correction luminance change point; a first calculation section to calculate a difference between the stored coordinates of the luminance change points and the coordinates of the correction luminance change points, as a distortion vector field; a second calculation section to calculate a component obtained by removing a translation component and a rotational component from the distortion vector field, as a correction vector field; and a correction section to correct an image captured by the imaging section by using the calculated correction vector field.

8 Claims, 15 Drawing Sheets

INFORMATION PROCESSING APPARATUS, INFORMATION PROCESSING METHOD, PROGRAM, AND IMAGING APPARATUS INCLUDING OPTICAL MICROSCOPE

CROSS REFERENCES TO RELATED APPLICATIONS

The present application claims priority to Japanese Patent Application JP 2010-049020 filed on Mar. 5, 2010, the entire contents of which is hereby incorporated by reference.

BACKGROUND

The present disclosure relates to an information processing apparatus, an information processing method, a program, and an imaging apparatus including an optical microscope, which process an image signal obtained by an image sensor to thereby correct distortion of an output image.

In the past, for example, a digital still camera including an image sensor such as a charge-coupled device (CCD) is widely used as an imaging device. When an image of an object is captured with such an imaging device, distortion may be caused in the captured image in some cases due to the shape of a lens included in the imaging device, or the like. To correct this distortion, various distortion correction techniques are used.

For example, in a calibration system disclosed in Japanese Patent Application Laid-open No. 2000-350239 (hereinafter, referred to as Patent Document 1), a distortion parameter used for correcting the distortion described above is estimated as follows. First, in the calibration system, a reference image constituted of patterns in which a geometrical shape is already defined is generated. Then, the reference image is projected onto a flat screen surface and captured with a camera. The reference image and the captured image of the reference image are subjected to image registration processing, with the result that a distortion parameter for distortion correction is estimated (see paragraph [0094] or the like of Patent Document 1).

Further, in Patent Document 1, based on a point $n_d$ on the captured image surface in which lens distortion is taken into consideration, a corresponding point $n_u$ on the captured image surface in which lens distortion is not taken into consideration is calculated. As described in paragraph [0084] of Patent Document 1, the point $n_u$ is calculated by an expression that is based on a distance from the center of distortion.

SUMMARY

For example, in a case where an image obtained by an optical microscope is digitized, complicated distortion that is difficult to be predicted is caused in an image to be output in many cases because of a complicated magnifying optical system of the microscope. In this case, it is difficult to correct the distortion of the image by using an expression that is based on a distance from the center of distortion as disclosed in Patent Document 1.

In addition, for example, when one object is observed with an optical microscope at high magnification, there may be a case where a plurality of digital images obtained by capturing images of parts of the object are subjected to stitching processing, and then the images of the object may be integrated into one. To appropriately perform the stitching processing, it is necessary to correct distortion of each digital image highly accurately.

In view of the circumstances as described above, it is desirable to provide an information processing apparatus, an information processing method, a program, and an imaging apparatus including an optical microscope, which are capable of correcting complicated distortion generated in an image obtained by an optical microscope highly accurately.

According to an embodiment, there is provided an information processing apparatus including a first storage means, a generation means, a determination means, a first calculation means, a second calculation means, and a correction means.

The first storage means stores coordinates of a plurality of luminance change points in which luminances are changed, in a calibration pattern that has a luminance distribution in which luminances are regularly changed in two axis directions orthogonal to each other.

The generation means generates standard pattern information on a luminance distribution of a calibration image generated by capturing an image of the calibration pattern by an imaging means capable of capturing an image obtained by an optical microscope.

The determination means determines coordinates of a luminance change point of the calibration image, the luminance change point corresponding to each of the plurality of luminance change points of the calibration pattern, as coordinates of a correction luminance change point, by matching processing between the luminance distribution of the calibration image and the generated standard pattern information.

The first calculation means calculates a difference between the stored coordinates of the plurality of luminance change points and the coordinates of the correction luminance change points determined by the determination means in accordance with the plurality of luminance change points, as a distortion vector field.

The second calculation means calculates a component obtained by removing a translation component and a rotational component from the distortion vector field, as a correction vector field.

The correction means corrects an image captured by the imaging means by using the calculated correction vector field.

In the information processing apparatus, the standard pattern information on the luminance distribution of the calibration image generated by capturing the image of the calibration pattern is generated. Then, by the matching processing between the luminance distribution of the calibration image and the standard pattern information, the correction luminance change points on the calibration image are determined with high accuracy. Therefore, the accuracy of the distortion vector field and correction vector field also becomes high, and even when complicated distortion that is difficult to be predicted is caused in an image captured by the imaging means, the complicated distortion can be corrected with high accuracy. Further, the correction vector field is calculated as a component obtained by removing the translation component and the rotational component from the distortion vector field. Accordingly, a correction amount of an image to be corrected can be reduced and highly accurate image correction is realized.

The information processing apparatus may further include a second storage means for storing the correction vector field calculated by the second calculation means. In this case, the correction means may correct the image by using the correction vector field stored by the second storage means.

In the information processing apparatus, the correction vector field on predetermined imaging-capturing conditions in which an illumination optical system or the like is determined is stored by the second storage means. Therefore, in a case where an image is captured by the imaging means under the same imaging-capturing conditions, it is unnecessary to calculate a correction vector field anew, and it is possible to highly accurately correct a captured image by using the stored correction vector field. Accordingly, a processing time for the image correction can be shortened.

The generation means may generate standard pattern information on luminance information of each of divided areas that are obtained by dividing the calibration image into a plurality of areas. In this case, the determination means may determine the coordinates of the correction luminance change points in each of the divided areas by matching processing between the luminance distribution of each of the divided areas and the standard pattern information generated for each of the divided areas.

In the information processing apparatus, the standard pattern information is generated for each of the divided areas of the calibration image, and the matching processing is performed for each of the divided areas. Therefore, it is possible to generate the standard pattern information for each divided area, which is suitable for the matching processing with the divided area. Accordingly, it is possible to determine correction luminance change points of the divided areas highly accurately.

The calibration pattern may be formed of a checkered pattern in which one or more bright parts and one or more dark parts are alternately arranged, the bright parts and the dark parts each having a certain size in the two axis directions.

In this case, the first storage means may store coordinates of a plurality of intersections that correspond to boundaries between the bright parts and the dark parts in the checkered pattern.

Further, the generation means may perform Fourier transform on the calibration image to calculate a frequency having a largest intensity of a spectrum in each of the two axis directions and generate the standard pattern information by using at least one of the calculated frequencies of the two axis directions.

Further, the determination means may calculate a correlation value between a luminance value of each pixel of the calibration image and the standard pattern information to determine coordinates of a plurality of intersections that correspond to boundaries between bright parts and dark parts in the calibration image.

In the information processing apparatus, the checkered pattern is used as a calibration pattern, and the intersection of the checkered pattern is stored as a luminance change point. Further, the calibration image is subjected to Fourier transform, with the result that at least one of the calculated frequencies is used for generating the standard pattern information. Then, a correlation value between a luminance value of each pixel of the calibration image and standard pattern information is calculated, with the result that the intersection on the calibration image is determined highly accurately as a correction luminance change point.

According to another embodiment, there is provided an information processing method executed by an information processing apparatus.

In other words, the information processing method includes storing coordinates of a plurality of luminance change points in which luminances are changed, in a calibration pattern that has a luminance distribution in which luminances are regularly changed in two axis directions orthogonal to each other.

Standard pattern information on a luminance distribution of a calibration image is generated. The calibration image is generated by capturing an image of the calibration pattern by an imaging means capable of capturing an image obtained by an optical microscope.

Coordinates of a luminance change point of the calibration image is determined as coordinates of a correction luminance change point, the luminance change point corresponding to each of the plurality of luminance change points of the calibration pattern, by matching processing between the luminance distribution of the calibration image and the generated standard pattern information.

A difference between the stored coordinates of the plurality of luminance change points and the coordinates of the correction luminance change points determined by the determination means in accordance with the plurality of luminance change points is calculated as a distortion vector field.

A component obtained by removing a translation component and a rotational component from the distortion vector field is calculated as a correction vector field.

An image captured by the imaging means is corrected by using the calculated correction vector field.

According to another embodiment, there is provided a program causing an information processing apparatus to execute the information processing method described above. The program may be recorded on a recording medium.

According to another embodiment, there is provided an imaging apparatus including an optical microscope, an imaging means, a storage means, a generation means, a determination means, a first calculation means, a second calculation means, and a correction means.

The imaging means is capable of capturing an image obtained by the optical microscope.

The storage means stores coordinates of a plurality of luminance change points in which luminances are changed, in a calibration pattern that has a luminance distribution in which luminances are regularly changed in two axis directions orthogonal to each other.

The generation means generates standard pattern information on a luminance distribution of a calibration image generated by capturing an image of the calibration pattern by the imaging means.

The determination means determines coordinates of a luminance change point of the calibration image, the luminance change point corresponding to each of the plurality of luminance change points of the calibration pattern, as coordinates of a correction luminance change point, by matching processing between the luminance distribution of the calibration image and the generated standard pattern information.

The first calculation means calculates a difference between the stored coordinates of the plurality of luminance change points and the coordinates of the correction luminance change points determined by the determination means in accordance with the plurality of luminance change points, as a distortion vector field.

The second calculation means calculates a component obtained by removing a translation component and a rotational component from the distortion vector field, as a correction vector field.

The correction means corrects an image captured by the imaging means by using the calculated correction vector field.

According to another embodiment, there is provided an information processing apparatus including a first storage section, a generation section, a determination section, a first calculation section, a second calculation section, and a correction section.

The first storage section stores coordinates of a plurality of luminance change points in which luminances are changed, in a calibration pattern that has a luminance distribution in which luminances are regularly changed in two axis directions orthogonal to each other.

The generation section generates standard pattern information on a luminance distribution of a calibration image generated by capturing an image of the calibration pattern by an imaging section capable of capturing an image obtained by an optical microscope.

The determination section determines coordinates of a luminance change point of the calibration image, the luminance change point corresponding to each of the plurality of luminance change points of the calibration pattern, as coordinates of a correction luminance change point, by matching processing between the luminance distribution of the calibration image and the generated standard pattern information.

The first calculation section calculates a difference between the stored coordinates of the plurality of luminance change points and the coordinates of the correction luminance change points determined by the determination section in accordance with the plurality of luminance change points, as a distortion vector field.

The second calculation section calculates a component obtained by removing a translation component and a rotational component from the distortion vector field, as a correction vector field.

The correction section corrects an image captured by the imaging section by using the calculated correction vector field.

As described above, according to the embodiments, complicated distortion caused in an image obtained by an optical microscope, which is difficult to be predicted, can be corrected with high accuracy.

Additional features and advantages are described herein, and will be apparent from the following Detailed Description and the figures.

DETAILED DESCRIPTION

Hereinafter, embodiments will be described with reference to the drawings.

(First Embodiment)

Figure 1:
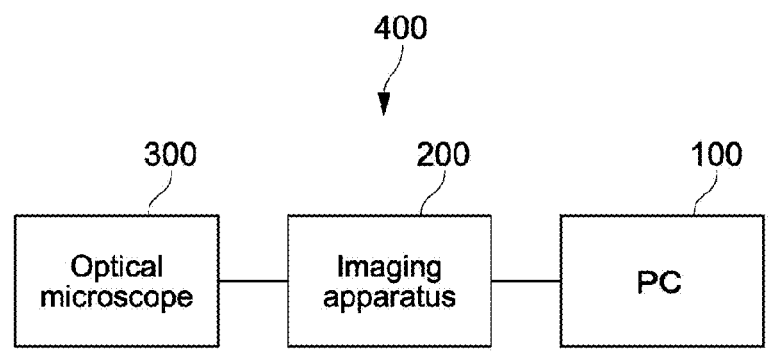
FIG. 1 is a block diagram showing a structural example of an imaging system including an information processing apparatus according to a first embodiment.
Figure 2:
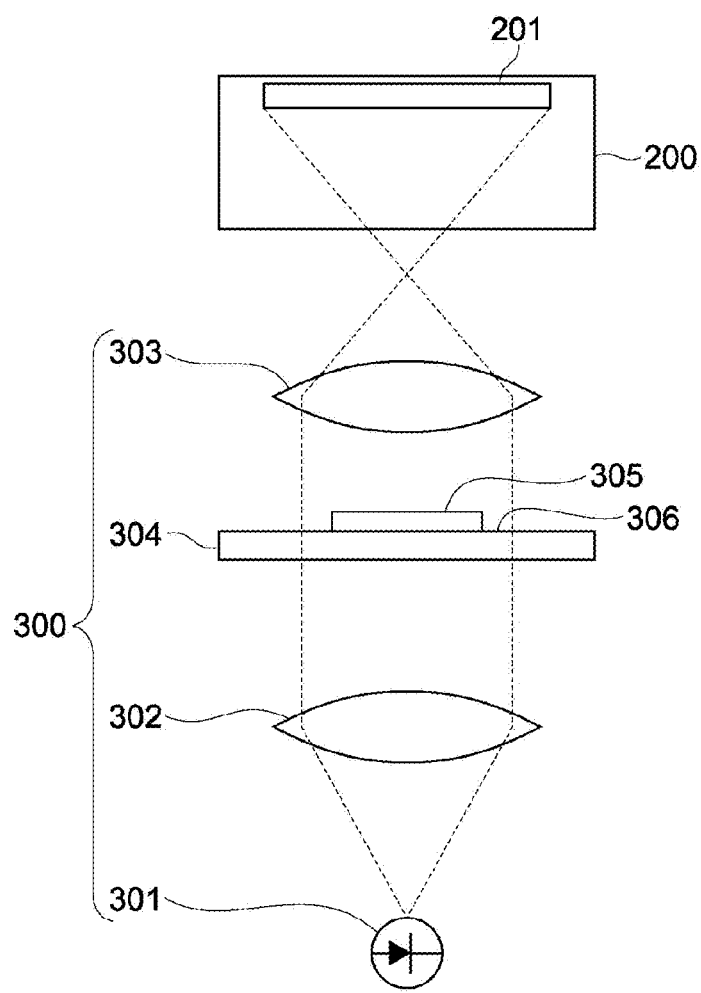
FIG. 2 is a diagram schematically showing structures of an optical microscope and an imaging apparatus shown in FIG. 1.

FIG. 1 is a block diagram showing a structural example of an imaging system including an information processing apparatus according to a first embodiment. FIG. 2 is a diagram schematically showing structures of an optical microscope and an imaging apparatus shown in FIG. 1. An imaging system 400 in FIG. 1 includes an optical microscope 300, an imaging apparatus 200 as an imaging means, and a personal computer (PC) 100 as an information processing apparatus. As the imaging apparatus 200, for example, a digital still camera is used.

The optical microscope 300 includes, for example, a light source 301 such as a light-emitting diode (LED), an illumination optical system 302, an image-forming optical system 303, and a sample stage 304 provided on an optical path of the illumination optical system 302 and image-forming optical system 303. On the sample stage 304, an observed area 306 is provided in which a sample 305 is placed, and an image of the observed area 306 is generated.

The imaging apparatus 200 includes, for example, an image sensor 201 such as a charge-coupled device (CCD), and can capture an image of the observed area 306 that is obtained by the optical microscope 300 and store the image as image data. This image data is read by the PC 100 and is output after being subjected to data processing to be described later.

Here, the imaging apparatus 200 and the PC 100 will be described in detail.

Figure 3:
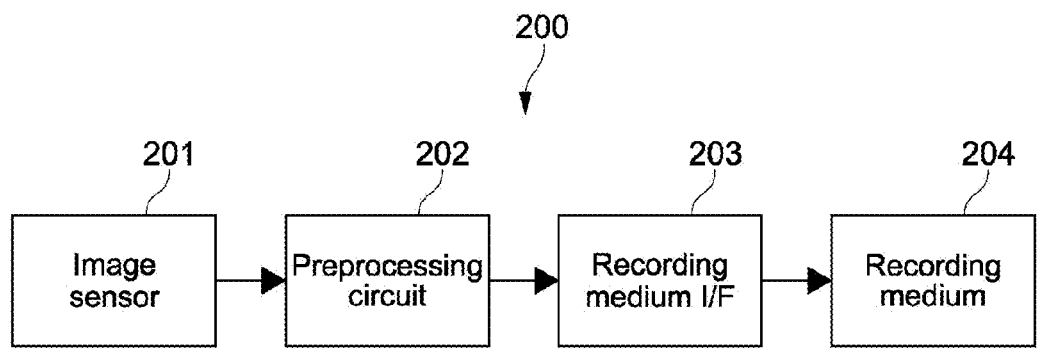
FIG. 3 is a block diagram showing a structural example of the imaging apparatus shown in FIG. 1.
Figure 4:
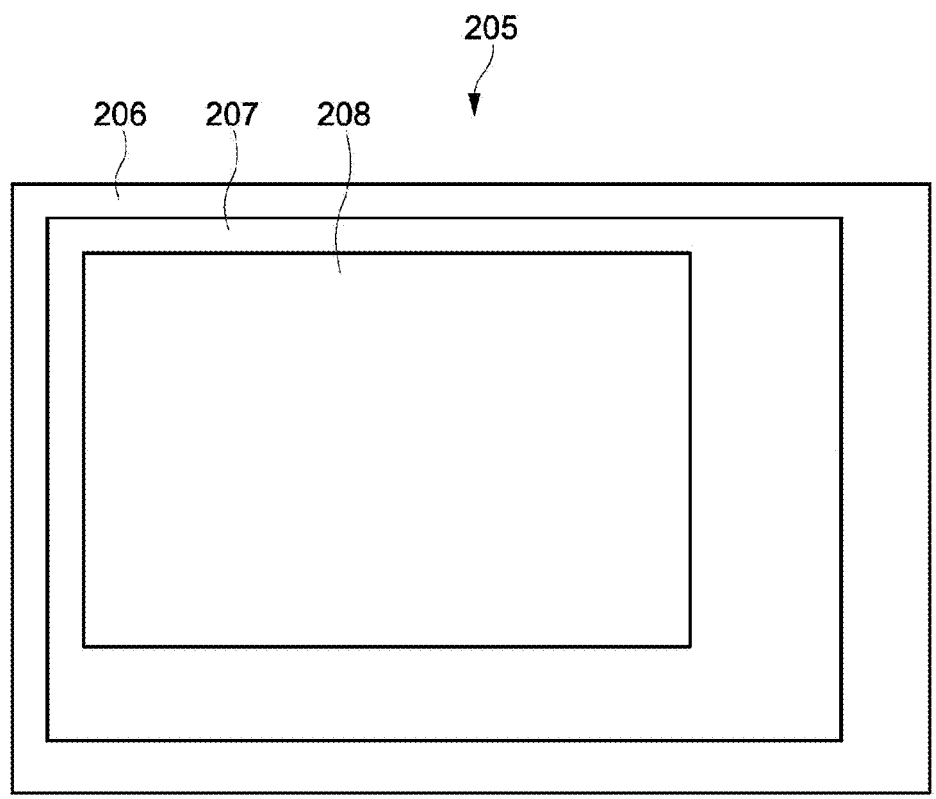
FIG. 4 is a diagram schematically showing Raw data as image data generated by the imaging apparatus shown in FIG. 3.

FIG. 3 is a block diagram showing a structural example of the imaging apparatus 200. FIG. 4 is a diagram schematically showing Raw data as image data generated by the imaging apparatus 200.

The imaging apparatus 200 includes the image sensor 201, a preprocessing circuit 202, a recording medium interface (I/F) 203, and a recording medium 204. As the recording medium 204, for example, a memory card, an optical disc, or a magnetic optical disc is used.

Incident light is collected by a lens (not shown) under predetermined imaging-capturing conditions (aperture, zoom, focus, and the like), and an optical image is formed on an imaging surface of the image sensor 201. The image sensor 201 outputs the imaged result of the optical image formed on the imaging surface to the preprocessing circuit 202. In this embodiment, a sensor in which color filters of G are arranged in checkered pattern is used as the image sensor 201, but a three-plate sensor, a black-and-white sensor, a line sensor, or a multi-sensor may be used, for example.

The preprocessing circuit 202 previously processes an output signal from the image sensor 201 and controls the recording medium I/F 203 to record a Raw data file on the recording medium 204. As shown in FIG. 4, as Raw data 205, a rectangular CCD image having an invalid pixel area 206 such as optical black (OPB), a valid pixel area 207, and an effective pixel area 208 is stored in dot sequence in the Raw data file.

[Structure of Information Processing Apparatus]

Figure 5:
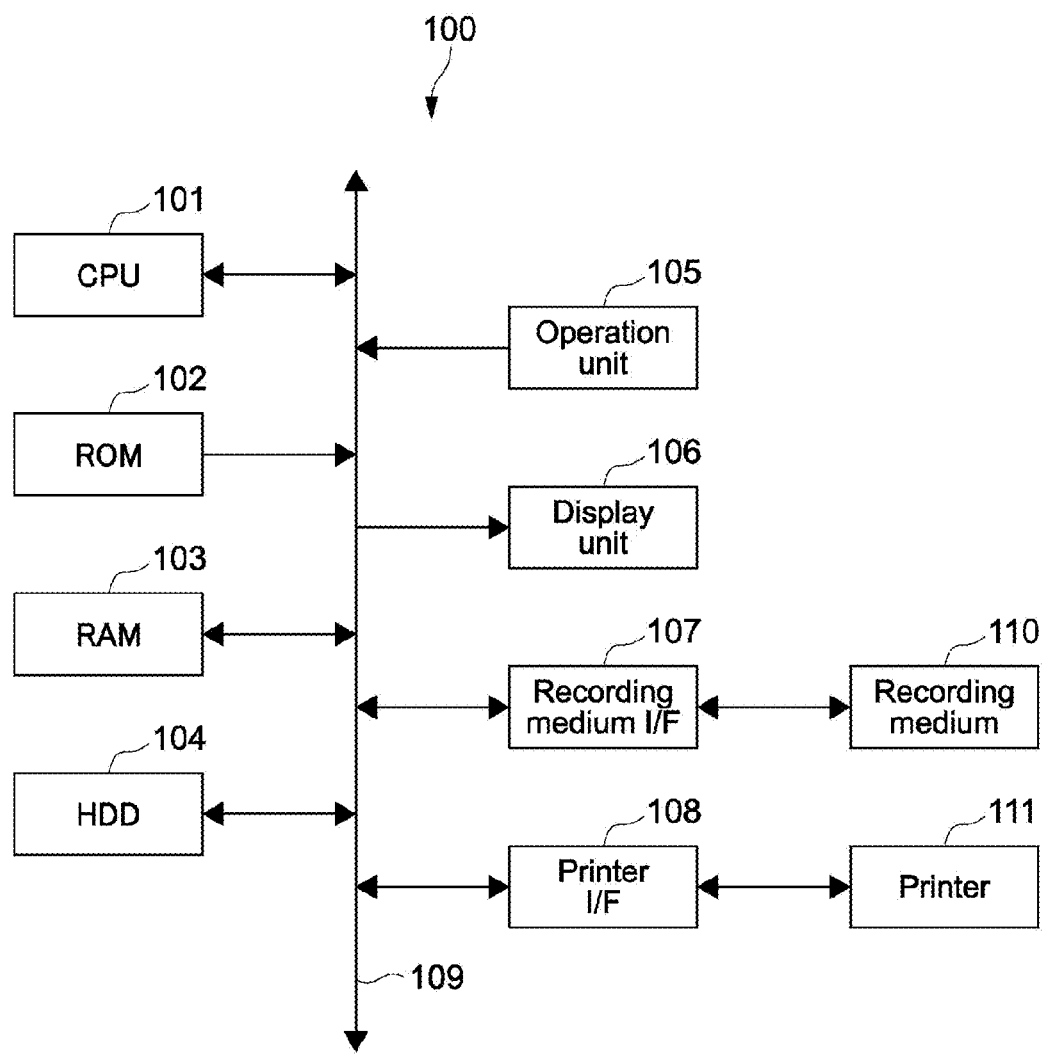
FIG. 5 is a block diagram showing a structural example of a PC shown in FIG. 1.

FIG. 5 is a block diagram showing a structural example of the PC 100. The PC 100 includes a CPU (Central Processing Unit) 101, a ROM (Read Only Memory) 102, a RAM (Random Access Memory) 103, an HDD (Hard Disk Drive) 104, an operation unit 105, a display unit 106, a recording medium interface (I/F) 107, a printer interface (I/F) 108, and a bus 109 that connects those components above to each other.

The CPU 101 reads a system program such as an operating system (OS) from the ROM 102 or the like, and executes the system program using a work area secured in the RAM 103. The CPU 101 reads an image processing program or the like from the ROM 102, the RAM 103, the HDD 104, or the like, and executes the program using the work area secured in the RAM 103, or a primary and/or secondary cache provided in the CPU 101.

The CPU 101 can perform, on the Raw data 205 described above, a series of image quality correction processing including optical correction processing, gamma correction processing, demosaic processing, noise reduction processing, and the like. Further, the CPU 101 forms recording image data by compressing luminance data and color data by a predetermined data compression system, and restores the compressed Raw data 205 by decompressing the recording image data. Here, the CPU 101 functions as a processing execution section, a progress information management section, a resource information acquisition section, a processing-priority setting section, and a processing control section.

The ROM 102 stores programs executed by the CPU 101, various types of data necessary for processing, and the like.

The RAM 103 includes a video RAM (VRAM) for image display (not shown), and is mainly used as a work area in which various types of processing are performed.

The HDD 104 includes a hard disk, and performs data write/read with respect to the hard disk in accordance with the control of the CPU 101.

The operation unit 105 includes numeric keys, character keys, arrow keys, various function keys, and the like and supplies, to the CPU 101, an operation input from a user. The operation unit 105 may include a pointing device such as a mouse. The CPU 101 controls the respective units to perform processing corresponding to the operation input that is input by the user via the operation unit 105.

The display unit 106 includes a display device such as an LCD (Liquid Crystal Display) and a CRT (Cathode Ray Tube), and displays an image corresponding to an image signal formed based on the luminance data and color data.

The recording medium I/F 107 performs data write/read with respect to a recording medium 110 such as a memory card, an optical disc, and a magnetic optical disc. Alternatively, as the recording medium I/F 107 and the recording medium 110, an HDD including a hard disk may be used.

The printer I/F 108 outputs printing data of the image, or the like to a printer 111.

[Operation of Information Processing Apparatus]

Figure 6:
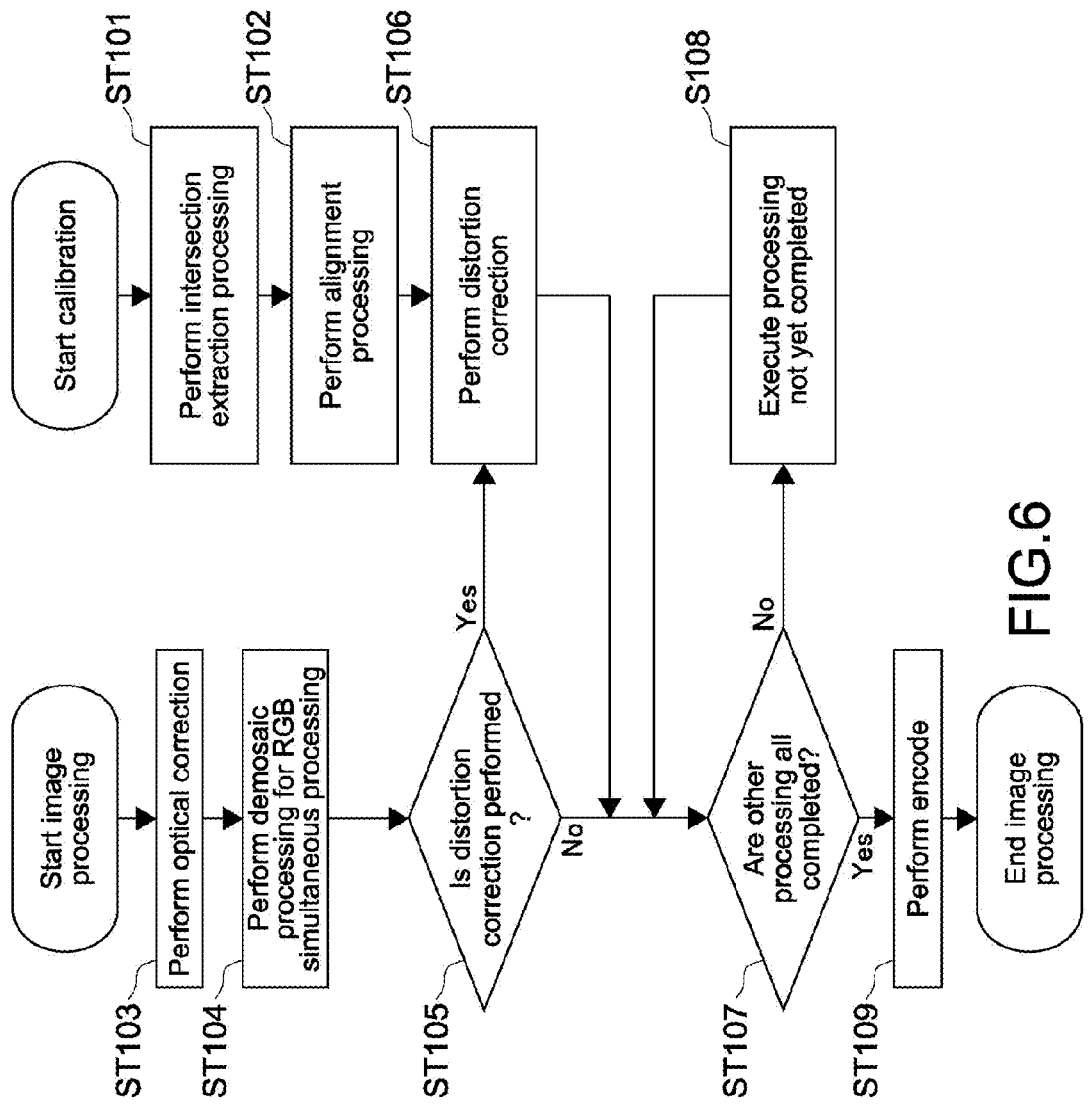
FIG. 6 is a flowchart showing processing of the PC shown in FIG. 1.

FIG. 6 is a flowchart showing the processing of the PC 100 serving as an information processing apparatus according to this embodiment. Here, a Raw data file of a sample image is recorded in the HDD 104 of the PC 100 in a compressed state, the sample image being an image of the observed area 306 in which the sample 305 is placed, which is generated by the imaging apparatus 200.

The CPU 101 of the PC 100 decompresses the Raw data file of the sample image that is recorded in the HDD 104. Then, the CPU 101 stores the Raw data 205 of the sample image stored in the Raw data file in a predetermined storage area of the RAM 103 in a decompressed state.

The CPU 101 performs calibration processing in advance in accordance with an instruction of the user or factory coordination. The calibration processing refers to processing for creasing a correction table involving the capture of a calibration image by the imaging apparatus 200, and to processing including intersection extraction processing (Step 101) and alignment processing (Step 102). The calibration processing will be described later in detail.

The CPU 101 performs optical correction processing on the Raw data 205 of the sample image, the optical correction processing including defect correction, RawNR (noise reduction), and the like (Step 103). Further, the CPU 101 performs demosaic processing on the Raw data 205 of the sample image (Step 104). The demosaic processing refers to processing of performing RGB simultaneous processing on the Raw data 205 of the sample image stored in dot sequence. Hereinafter, each pixel of the sample image is constituted of three values of R, G, B at a matched position on an image space. It should be noted that in this embodiment, the processing performed after the RGB simultaneous processing but before the distortion correction, such as gamma correction processing, is also included in the demosaic processing.

The CPU 101 seeks an instruction as to whether to perform the distortion correction from the user via a user interface, for example (Step 105). Upon receiving an instruction to perform the distortion correction from the user, the CPU 101 performs distortion correction processing based on the correction table obtained by the calibration processing described above (Step 106). The distortion correction processing refers to processing for correcting distortion of the shape of the sample image in each pixel, which will be described later in detail.

The CPU 101 judges whether there is processing not yet completed, in accordance with a progress flag (Step 107). Then, if there is processing not yet completed, the CPU 101 continues the processing until the processing not yet completed does not exist (Step 108). In this embodiment, all processing performed after the distortion correction is carried out in this step. The CPU 101 encodes the Raw data 205 of the processed sample image (Step 109), and then terminates the image processing.

[Intersection Extraction Processing]

Figure 7:
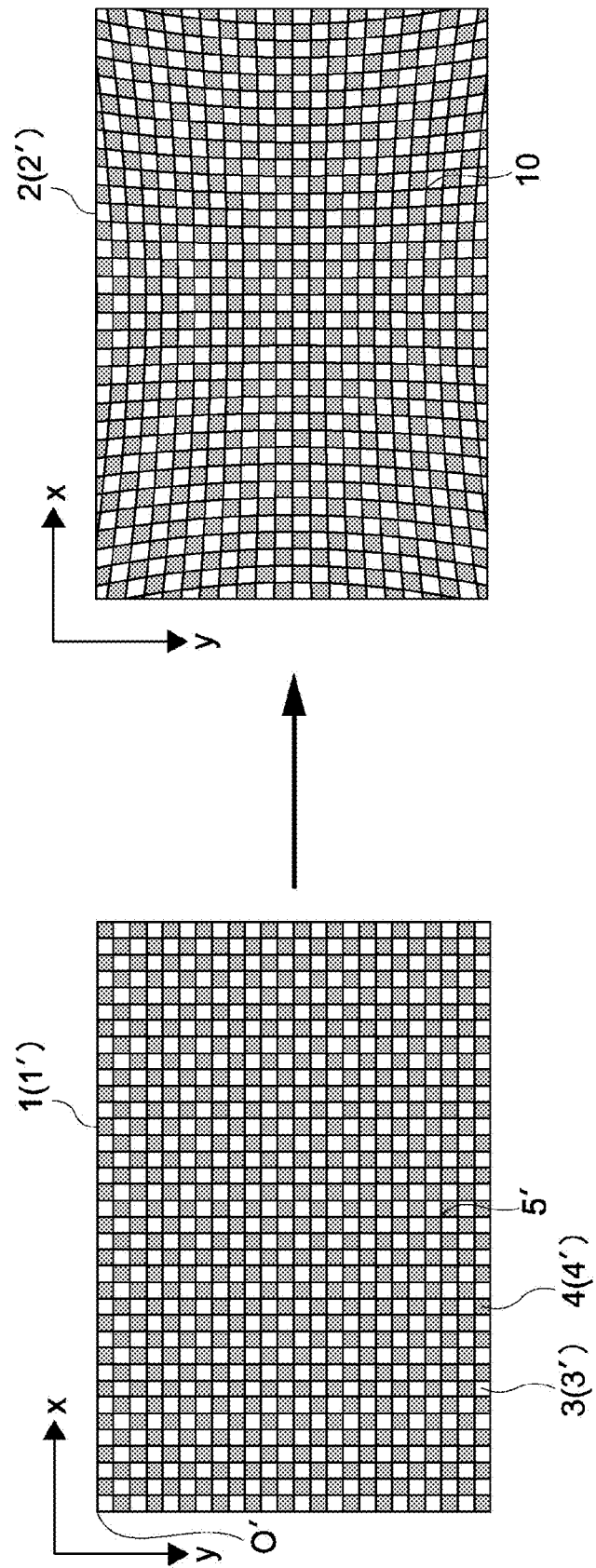
FIG. 7 is a diagram showing a calibration image used in intersection extraction processing shown in FIG. 6.

FIG. 7 is a diagram showing a calibration image used in the intersection extraction processing of Step 101 shown in FIG. 6.

For example, it is assumed that a user inputs an instruction to perform calibration processing via a calibration button of the operation unit 105. Then, an image of a calibration subject (not shown) having a checkered pattern 1 as a calibration pattern is captured by the imaging apparatus 200, and a Raw data file of a calibration image 2 is generated.

The calibration subject is arranged on, for example, a glass slide placed on the sample stage 304. Alternatively, a glass slide on which the checkered pattern 1 is drawn may be used as a calibration subject. In this embodiment, an image of a calibration subject, which is represented by the optical microscope 300 at 20-fold magnification, is captured by the imaging apparatus 200, and a calibration image 2 having the size of 60×40 (Kpixels) is generated. However, the magnification or the size of the calibration image 2 can be set as appropriate.

In this embodiment, an image of the checkered pattern 1 is captured. In the checkered pattern 1, one or more bright parts 3 and one or more dark parts 4, each of which has a certain size, are alternately arranged in an x-axis direction and a y-axis direction that are two axis directions orthogonal to each other. The bright part 3 of the checkered pattern 1 has a uniform color of white, and the dark part 4 thereof has a uniform color of black. Further, the shape of the bright part 3 and the dark part 4 is a square having the size of 50 μm on one side. However, the color and shape of the bright part 3 and the dark part 4 can be set as appropriate.

The CPU 101 calculates a theoretical checkered pattern 1' based on the shape of the checkered pattern 1 whose image is captured, and stores the theoretical checkered pattern 1' in the HDD 104 or the like. For example, in this embodiment, based on the magnification of the optical microscope 300, the size of each side of the bright part 3 and dark part 4 in the checkered pattern 1, and a pixel pitch of the image sensor 201 (5.94 μm in this embodiment), the size of each side of a bright part 3' and a dark part 4' of the theoretical checkered pattern 1' is calculated by the following expression.

$$\frac{20 \times 50}{5.94} \approx 168.35 \quad \text{[Expression 1]}$$

As a result, coordinates of an intersection 5' as a boundary between the bright part 3' and the dark part 4' are stored as a luminance change point of the checkered pattern 1' in the HDD 104. Regarding the coordinates, for example, it may be possible to define an origin point O' as a reference on the upper left portion or the like of the checkered pattern 1' shown in FIG. 7, and define coordinates with the origin point O' as a reference.

A Raw data file of the calibration image 2 is compressed and recorded in the HDD 104 of the PC 100 in that state. It should be noted that the Raw data file of the calibration image 2 that is generated by the imaging apparatus 200 may be stored in the HDD 104 of the PC 100 in advance.

Due to the complicated magnifying optical system constituted of the illumination optical system 302, the image-forming optical system 303, and the like of the optical microscope 300, complicated distortion that is difficult to be predicted is caused in the calibration image 2. FIG. 7 shows a calibration image 2 in which the distortion of the shape is not complicated. This is because description on distortion correction processing according to this embodiment will be easily understood.

The CPU 101 stores the Raw data of the calibration image 2 in a decompressed state in a predetermined area of the RAM 103. Then, the optical correction processing and demosaic processing described in Steps 103 and 104 of FIG. 6 are performed on the Raw data of the calibration image 2. Thus, the calibration image 2 becomes an image on which all shape distortion components caused by the illumination optical system 302, the glass slide placed on the sample stage 304, and the image-forming optical system 303 are superimposed together with a rotational component and a translation component, in contrast to the theoretical checkered pattern 1'. The rotational component and the translation component used herein refer to components caused by, for example, a tolerance involving the attachment of a lens included in the image-forming optical system 303, a tolerance involving the attachment of the imaging apparatus 200, a deviation of the glass slide placed on the sample stage 304, or the like.

The CPU 101 reduces the size of the calibration image 2 having the size of 60×40 (Kpixels) into the size of 256×256 (pixels) by a filter such as Lanczos. Then, the CPU 101 performs Fourier transform on the size-reduced calibration image 2'. By reducing the size of the calibration image 2, it is possible to reduce a computing amount necessary for Fourier transform. However, a calibration image 2 whose size is not reduced may be subjected to Fourier transform.

Figure 8:
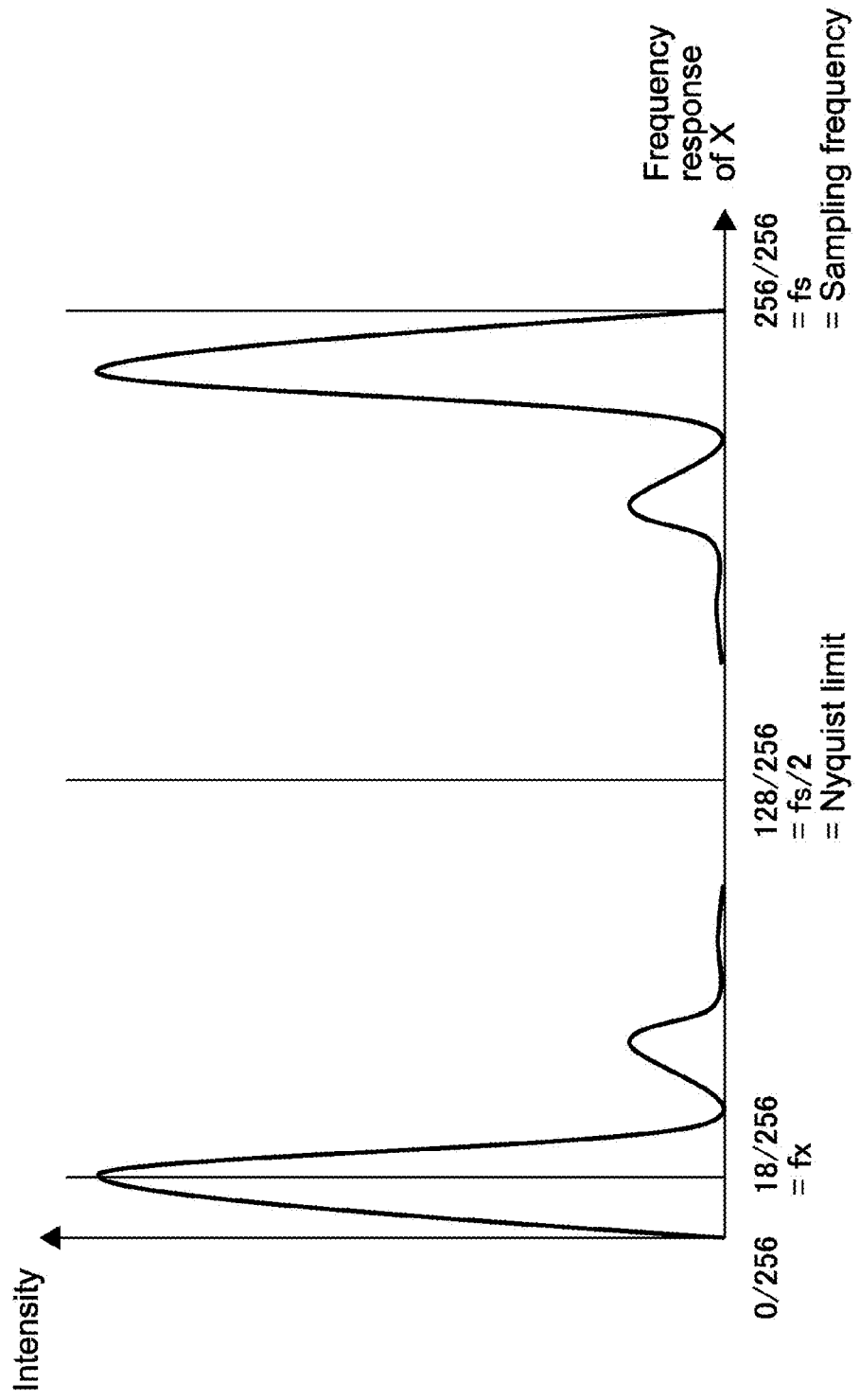
FIG. 8 is a graph showing a frequency response of a spectrum in an x-axis direction and an intensity thereof at a time when the calibration image shown in FIG. 7 is subjected to Fourier transform.

FIG. 8 is a graph showing a frequency response of a spectrum in the x-axis direction and an intensity thereof in the calibration image 2' that has been subjected to Fourier transform. The reduced size of the calibration image 2' is 256×256 (pixels), and therefore a sampling frequency fs can be assumed to be fs=256/256. The Nyquist limit is ½ of the sampling frequency fs, and therefore fs/2=128/256 is obtained. The CPU 101 focuses on a frequency smaller than the Nyquist limit fs/2, and calculates a frequency fmax=18/256, in which the intensity of the spectrum becomes largest.

The sine wave of the frequency fmax=18/256 is a sine wave that vibrates 18 times in the size of 256 (pixels), a wavelength of which corresponds to 256/18 (pixels). When the sine wave is applied to the calibration image 2 having the size of 60×40 (Kpixels), a wavelength thereof corresponds to 333 (pixels) as represented by the following expression.

$$\frac{256}{18} \times \frac{6000}{256} \approx 333 \quad \text{[Expression 2]}$$

The CPU 101 generates a function z(x,y) representing a sinusoidally curved surface, as standard pattern information of a luminance distribution of the calibration image 2. The function z(x,y) is represented by the product of sine waves sin(fx) and sin(fy) each having a wavelength corresponding to 333 (pixels), as shown below.

$$z(x,y)=\sin(fx)\sin(fy) \quad \text{[Expression 3]}$$

Figure 9B:
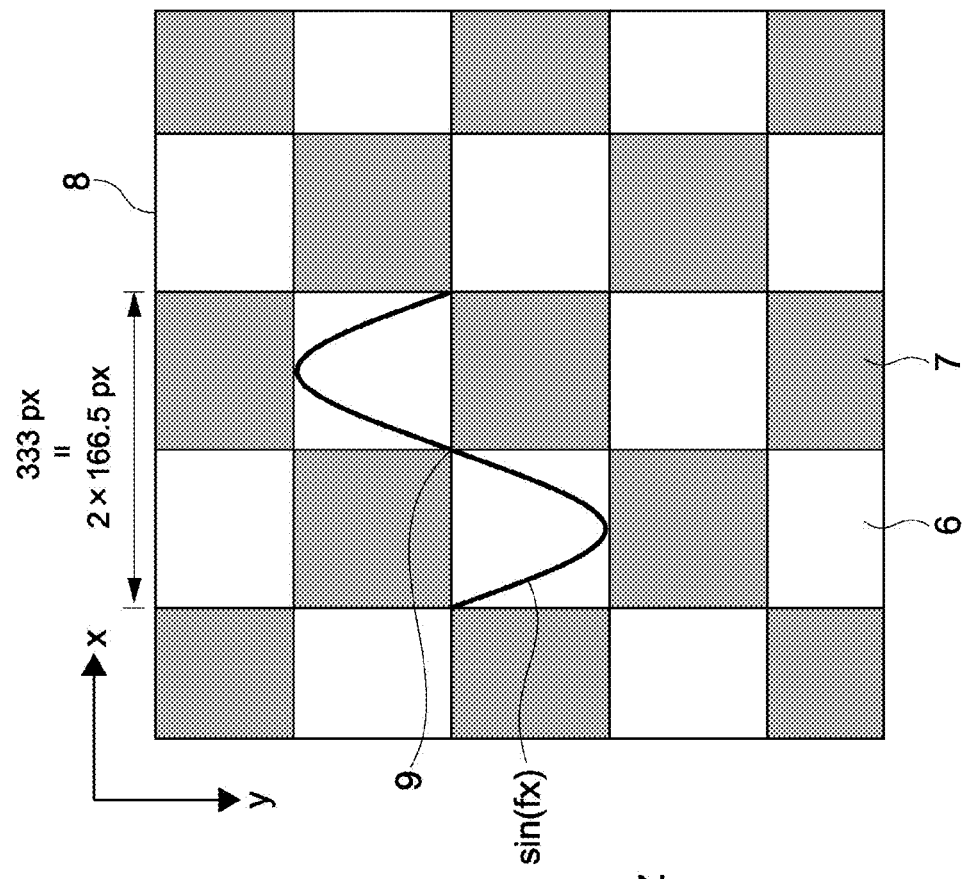
FIG. 9 are diagrams for explaining a sinusoidally curved surface represented by a function generated as standard pattern information of a luminance distribution of the calibration image shown in FIG. 7.
Figure 9A:
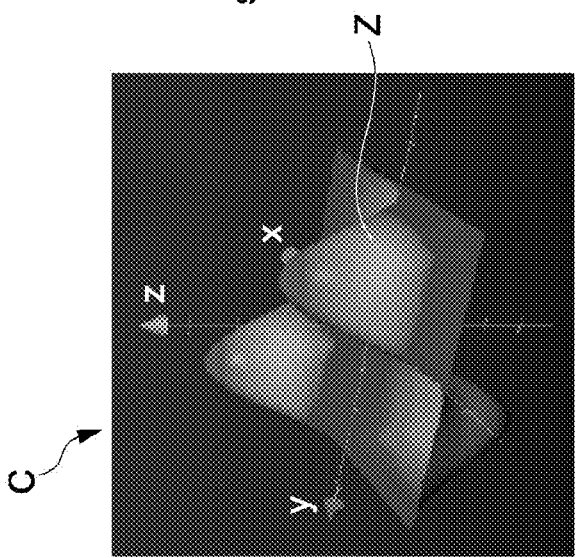

FIG. 9 are diagrams for explaining a sinusoidally curved surface Z represented by the above function z(x,y). FIG. 9A is a diagram showing the curved surface Z in a coordinate system C of an x axis, a y axis, and a z axis. The sin(fx) used in the function z(x,y) is set such that sin(f0) is an inflection point when x=0. Similarly, the sin(fx) is also set such that sin(f0) is an inflection point when y=0. Therefore, as shown in FIG. 9A, the curved surface Z is a curved surface in which z(0,0)=0 at the origin point (0,0) of the coordinate system C.

Here, the range of (x,y) in which the function z(x,y)>0 is assumed to be a range corresponding to a bright part of the checkered pattern, and the range of (x,y) in which the function z(x,y)<0 is assumed to be a range corresponding to a dark part of the checkered pattern. Thus, as shown in FIG. 9B, it is assumed that the function z(x,y) represents a checkered pattern 8 including a plurality of bright parts 6 and dark parts 7 each having the size of 333 (pixels)/2=166.5 (pixels) in the x-axis direction and the y-axis direction orthogonal to each other. Further, the origin point (0,0) of the coordinate system C shown in FIG. 9A corresponds to the intersection 9 of the checkered pattern 8.

The CPU 101 performs convolution by using a luminance value of each pixel of the calibration image 2 and the function z(x,y) for the purpose of the matching processing of the calibration image 2 and the curved surface Z. For example, the CPU 101 superimposes the calibration image 2 and the curved surface Z on each other while shifting relative positions thereof to calculate the following correlation value.

$$\text{Correlation value}=\Sigma I(x',y')z(x,y) \quad \text{[Expression 4]}$$

Here, I(x',y') is a luminance value of a pixel positioned at coordinates (x',y') defined on the calibration image 2. The coordinates (x',y') correspond to the coordinates defined on the theoretical checkered pattern 1' stored in the HDD 104 or the like shown in FIG. 7. In other words, the coordinates (x',y') are coordinates with the origin point at the upper left point of the calibration image 2. On the other hand, the function z(x,y) refers to coordinates in the coordinate system C shown in FIG. 9A. In the above-mentioned expression, there are used the coordinates (x',y') of a pixel of the calibration image 2, which is located at a position represented by the coordinates (x,y) in the coordinate system C when the calibration image 2 and the curved surface Z are superimposed on each other. Therefore, if the relative positions of the calibration image 2 and the curved surface Z are changed, the pixel at the position of the coordinates (x,y) differs, and the coordinates (x',y') thereof is also changed.

The CPU 101 judges that the calibration image 2 and the curved surface Z are best matched when the calculated correlation value takes the largest value (local maximum). Then, the CPU 101 determines the coordinates (x',y') of a pixel corresponding to the origin point (0,0) seen in the coordinate system C at that time, as coordinates of an intersection 10 (see FIG. 7) serving as a correction luminance change point. Accordingly, the intersection 10 is extracted from the calibration image 2. The relationship between the coordinates (x',y') on the calibration image 2 and the coordinates (x,y) in the coordinate system C can be set as appropriate as long as the correlation can be grasped.

In the function z(x,y), the matching processing may be locally performed on the calibration image 2 while using the curved surface Z represented by a certain range of x and y. For example, the range is defined as follows.

−166.5 (pixels)≤x≤166.5 (pixels)
−166.5 (pixels)≤y≤166.5 (pixels)

Thus, by the function z(x,y), the curved surface Z including parts corresponding to two bright parts 6 and two dark parts 7 of the checkered pattern 8 is represented as shown in FIG. 9A. By locally performing the matching processing on the calibration image 2 while using the curved surface Z, it is possible to accurately determine the coordinates of an intersection 10 on the calibration image 2. The range of x and y may be set as appropriate.

Alternatively, while using the curved surface Z extending over the calibration image 2, it may be possible to calculate the coordinates of all intersections 10 on the calibration image 2 at a time by performing the matching processing once on the calibration image 2 and the curved surface Z. It should be noted that examples of the computation for calculating the correlation value include various computations for judging the similarity between the calibration image 2 and the curved surface Z, such as the computation for calculating a square of a difference between a luminance value and a function value in an area in which the calibration image 2 and the curved surface Z overlap, in addition to the above-mentioned computation.

By the matching processing, all shape distortion components caused by the illumination optical system 302, the glass slide placed on the sample stage 304, and the image-forming optical system 303 are extracted as an intersection 10 of the calibration image 2 together with a rotational component and a translation component. For example, in a case where the calibration image 2 formed of 60×40 (Kpixels) is captured, an edge portion of the calibration image 2 becomes blurred due to a diffraction limit determined by the illumination optical system 302, the image-forming optical system 303, and the like of the optical microscope 300. In this case, it is difficult to determine the intersection 10 based on only a luminance value of each pixel of the calibration image 2. However, in this embodiment, it is possible to determine an intersection 10 of the calibration image 2 highly accurately by the matching processing.

The CPU 101 calculates a difference between the coordinates of an intersection 5' of the theoretical checkered pattern 1' stored in the HDD 104 or the like and the coordinates of the extracted intersection 10 on the calibration image 2, which corresponds to the intersection 5', as a distortion vector field.

Figure 10:
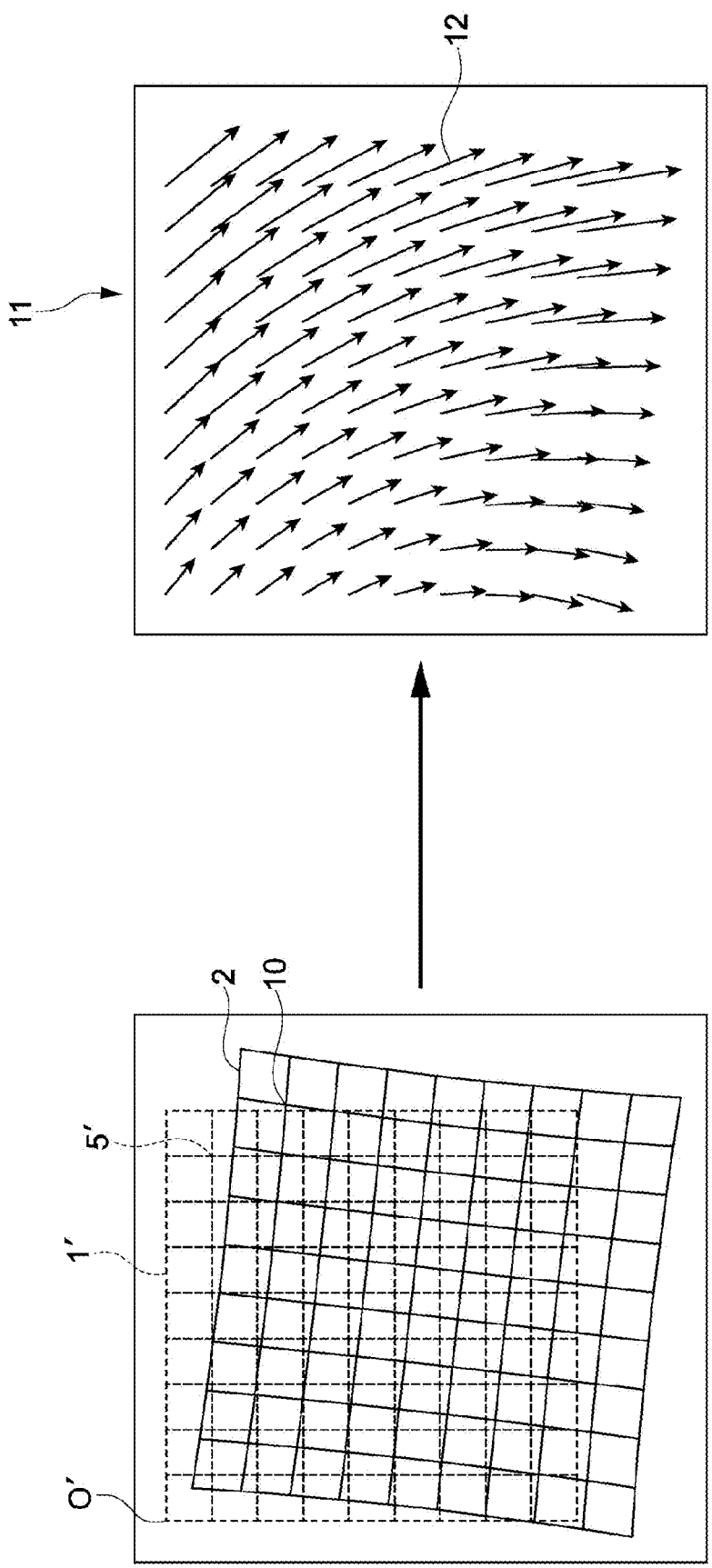
FIG. 10 is a diagram for explaining a distortion vector field obtained by calculating a difference between coordinates of each intersection of a theoretical checkered pattern and coordinates of an intersection on the calibration image.

FIG. 10 is a diagram for explaining the distortion vector field. In the following description, the intersection 5' of the theoretical checkered pattern 1' and the intersection 10 of the calibration image 2 are focused. Therefore, in FIG. 10, for easy understanding of the description, the illustration of the bright parts and the dark parts is simplified and the number thereof is reduced. Further, in FIG. 10, a checkered pattern having a distorted shape is shown as a calibration image 2.

As shown in FIG. 10, the CPU 101 sets the theoretical checkered pattern 1' so as to have no rotational component with respect to the origin point O' on the upper left of FIG. 10. Then, a difference between the coordinates of intersections 5' of the theoretical checkered pattern 1' and those of intersections 10 corresponding thereto on the calibration image 2 is calculated as a distortion vector field 11. As a result, the distortion vector field 11 includes all shape distortion components caused by the image-forming optical system 303 and the like together with the rotational component and the translation component.

By using the distortion vector field 11, it is also possible to correct a sample image captured by the imaging apparatus 200. However, discrete data (vectors 12) corresponding to the pixels of the sample image, which is included in the distortion vector field 11, does not necessarily correspond to integer vertexes of the coordinates, so the handling thereof is not easy. Further, when the sample image having the size of 60×40 (Kpixels) is corrected by the distortion vector field 11 including the rotational component and the translation component, a huge computing amount and a huge memory capacity are necessary. In addition, a correction amount on the sample image is also large, and therefore it is difficult to realize distortion correction with high accuracy.

In this regard, in this embodiment, the CPU 101 performs alignment processing (Step 102 shown in FIG. 6) described below.

[Alignment Processing]

The alignment processing refers to processing in which a rotational component and a translation component are extracted from the distortion vector field 11 by an evaluation function such as a Gaussian function, and performs inverse mapping thereon so as to perform resampling in a spatial position corresponding to an intersection 5' of the theoretical checkered pattern 1'.

In this embodiment, the alignment processing is performed using a function described below.

$$v_{xy} = \frac{\sum_{u \in U} \{E(d_u) \cdot u\}}{\sum_{u \in U} E(d_u)}$$ [Expression 5]

$$d_u := \sqrt{(u_x - x)^2 + (u_y - y)^2}$$

u=($u_x$, $u_y$): Vector before resampling
U: Set of vectors before resampling
E(x): Evaluation function (Gaussian function having length of σ on each side of square)

Figure 11:
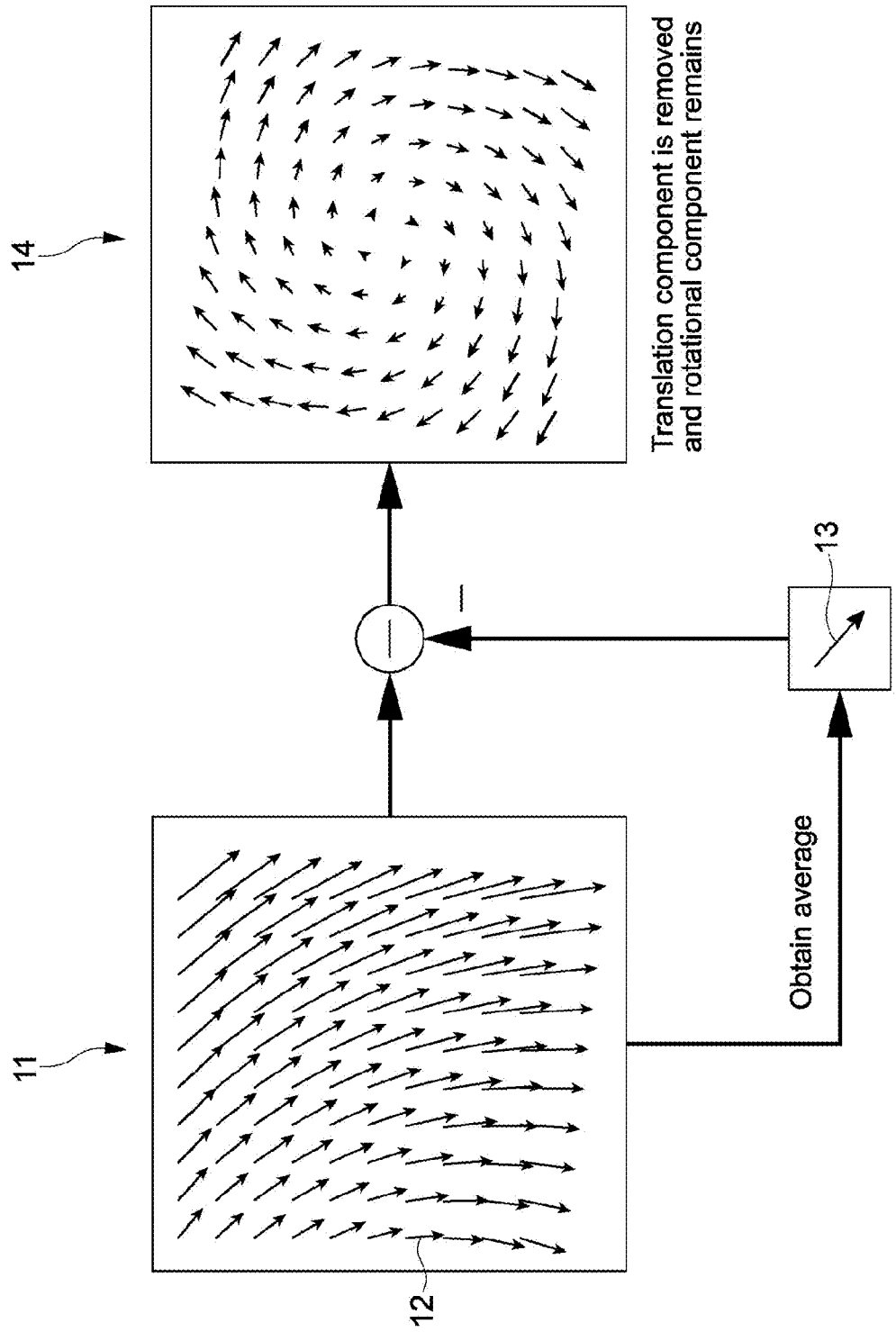
FIG. 11 is a diagram for specifically explaining alignment processing shown in FIG. 6.
Figure 12:
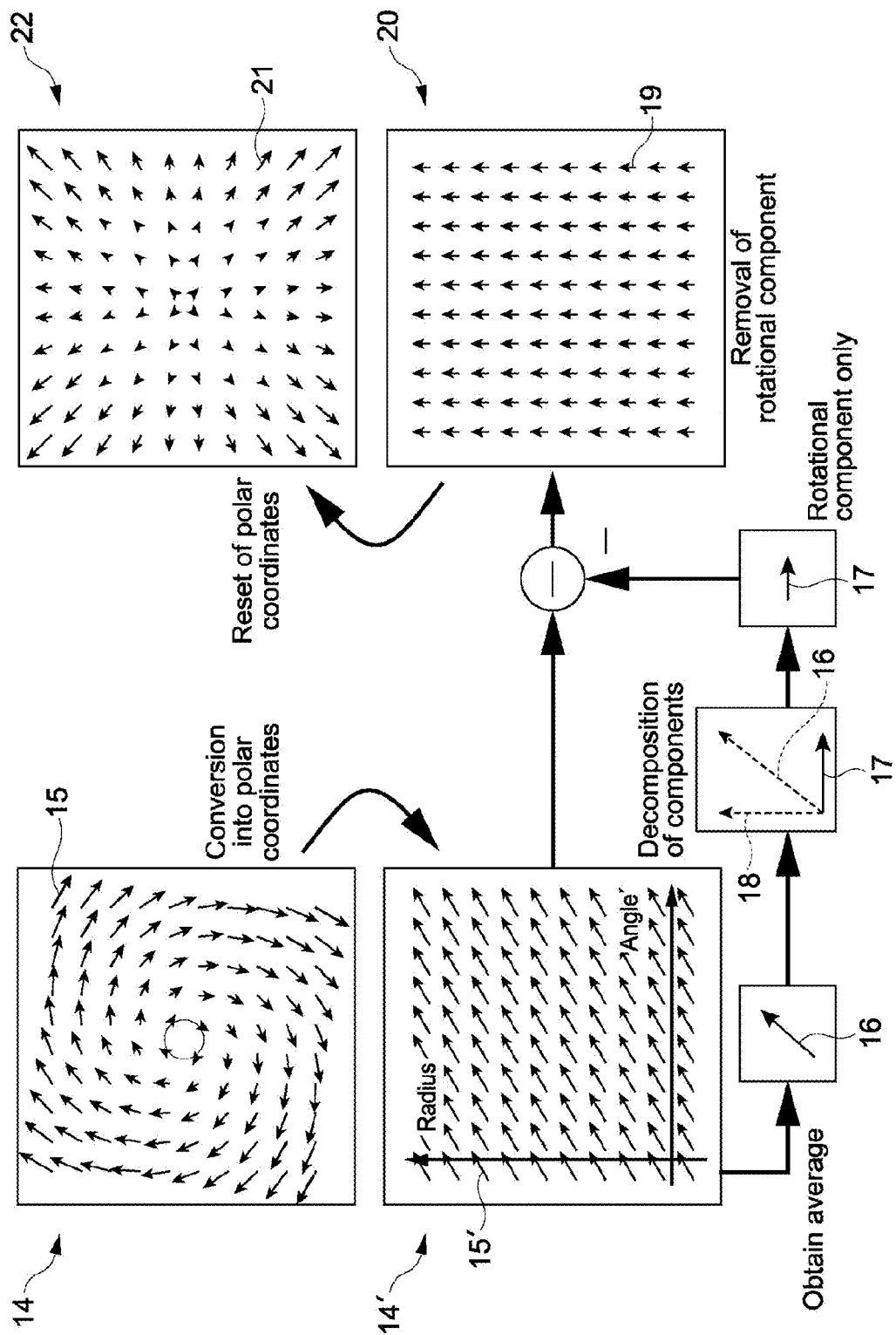
FIG. 12 is a diagram for specifically explaining the alignment processing shown in FIG. 6.
Figure 13:
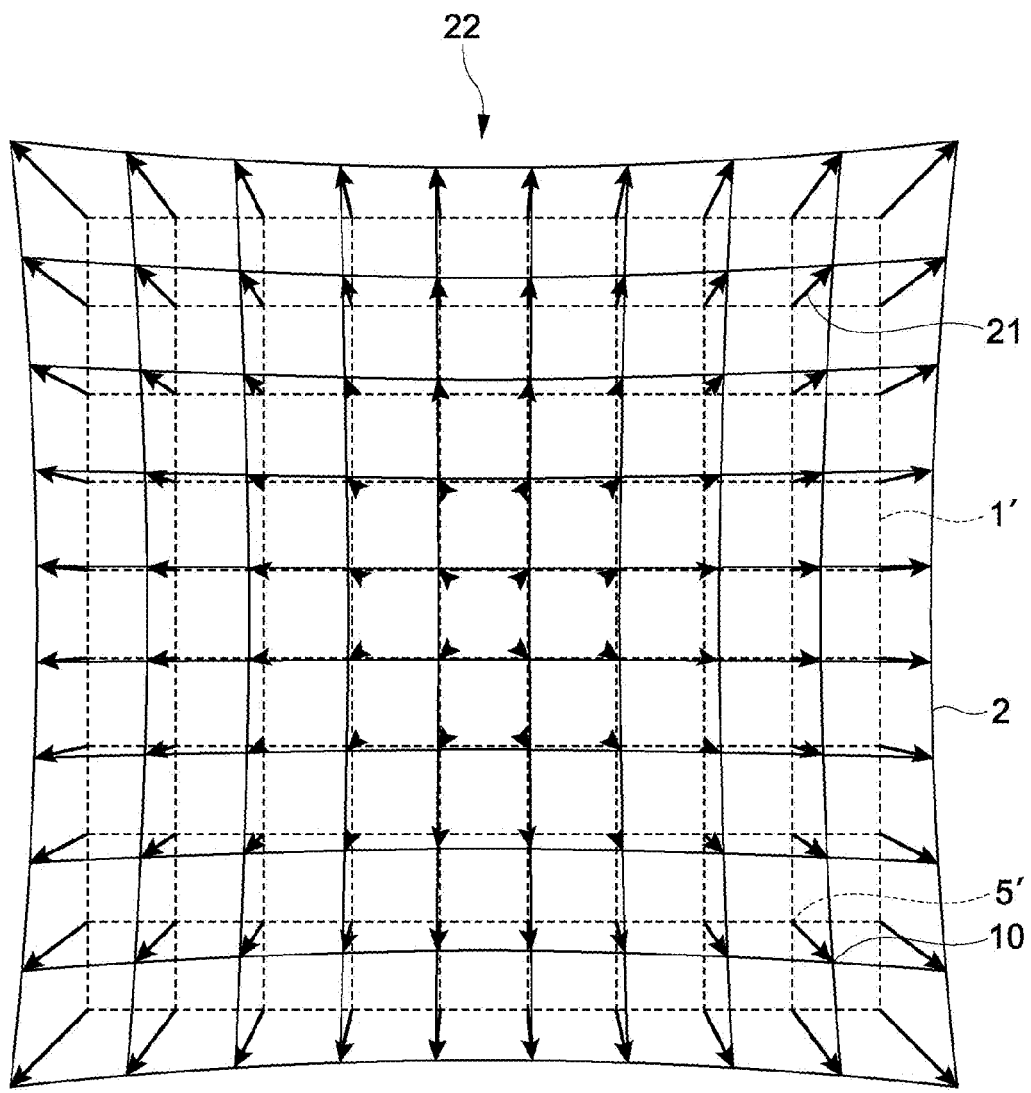
FIG. 13 is a diagram for specifically explaining the alignment processing shown in FIG. 6.

FIGS. 11 to 13 are diagrams for specifically explaining the alignment processing using the function described above.

First, the CPU 101 calculates an average vector 13 of a plurality of vectors 12 in the distortion vector field 11 shown in FIG. 11. Then, the average vector 13 is subtracted from each vector 12 of the distortion vector field 11. Accordingly, the translation component is removed from the distortion vector field 11, and a middle distortion vector field 14 shown in FIG. 11 is generated. The middle distortion vector field 14 is a vector field in which the rotational component remains.

As shown in FIG. 12, the CPU 101 converts each vector 15 of the middle distortion vector field 14 into polar coordinates and generates a converted middle distortion vector field 14'. Each vector 15' of the middle distortion vector field 14' is represented by a component of an angular direction indicating a rotational component and a component radially diffusing from a position corresponding to the center of the calibration image 2.

The CPU 101 calculates an average vector 16 of a plurality of vectors 15' represented in polar coordinates. The average vector 16 is decomposed into an angular component, that is, a rotational component 17, and a diffusion component 18. In the decomposed rotational component 17 and diffusion component 18, the rotational component 17 is extracted and the rotational component 17 is subtracted from each vector 15' of the converted middle distortion vector field 14'. Accordingly, a correction vector field 20 including a plurality of correction vectors 19 represented in polar coordinates is generated. The correction vectors 19 of the correction vector field 20 are returned from the polar coordinates to the original coordinates, and a correction vector field 22 including a plurality of correction vectors 21 is calculated. The correction vector field 22 has a component obtained by removing the rotational component and the translation component from all shape distortion components caused by the image-forming optical system 303 and the like.

As shown in FIG. 13, it is assumed that a calibration image 2 including a distortion component from which a rotational component and a translation component are removed is set in a spatial position corresponding to the theoretical checkered pattern 1'. Thus, the correction vector field 22 corresponds to a vector field represented by the difference between the coordinates of an intersection 5' on the checkered pattern 1' and the coordinates of an intersection 10 of the calibration image 2. The correction vector field 22 is stored in the HDD 104 or the like, or is stored in a predetermined storage area of the RAM 103 to be used as a correction table by the CPU 101.

For example, due to a change in design of the illumination optical system 302 or the image-forming optical system 303, the attachment of the imaging apparatus 200, or deterioration over time, the calibration processing may be necessary to be updated. In such a case, for example, by an instruction of calibration from the user, the intersection extraction processing and alignment processing described above are performed, and the correction table of the correction vector field 22 is generated.

[Distortion Correction Processing]

Figure 14:
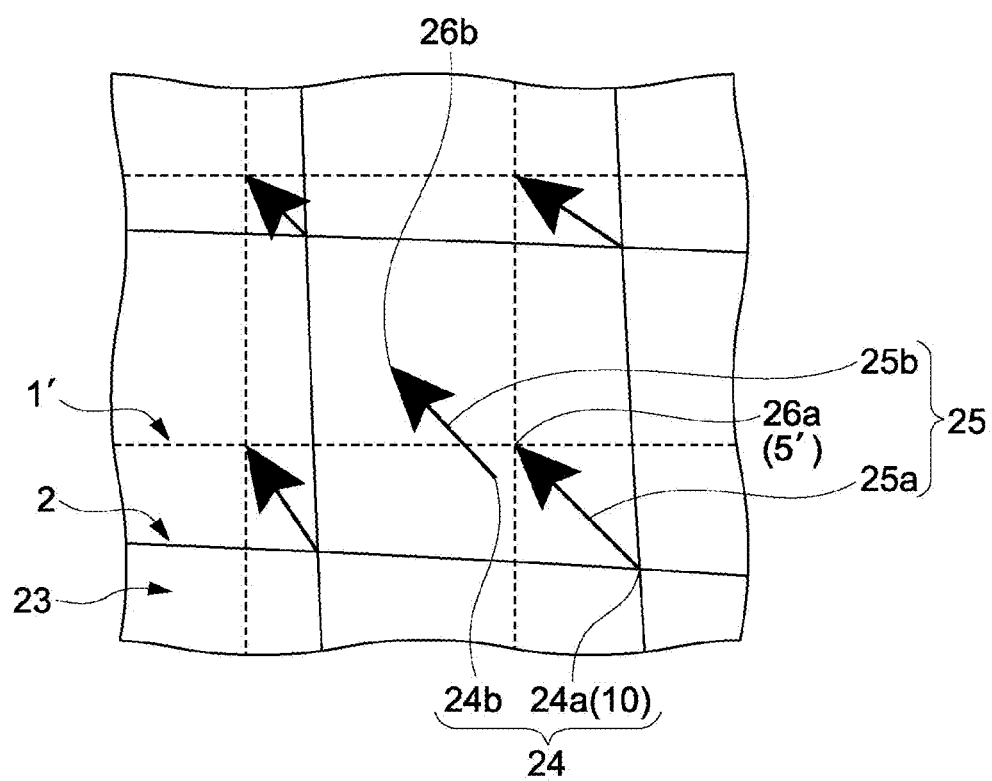
FIG. 14 is a diagram for explaining a method for distortion correction processing shown in FIG. 6.

FIG. 14 is a diagram for explaining a method for the distortion correction processing of Step 106 shown in FIG. 6.

The CPU 101 calculates an inverse map 25 that corresponds to the coordinates of each pixel 24 of the sample image 23 based on the correction table of the correction vector field 22 stored in the HDD 104 or the like. For example, as shown in FIG. 14, it is assumed that a pixel 24a on the sample image 23 has the same coordinates as those of an intersection 10 on the calibration image 2, which are determined in the intersection extraction processing. In this case, an inverse vector of a correction vector 21 included in the correction vector field 22, which corresponds to the intersection 10, is calculated as an inverse map 25a. Then, based on the inverse map 25a, the corrected coordinates of a pixel 26a corresponding to the pixel 24a of the sample image 23 are calculated. The corrected coordinates of the pixel 26a correspond to the coordinates of the intersection 5' on the checkered pattern 1' when the theoretical checkered pattern 1' and the calibration image 2 are set as shown in FIG. 13.

On the other hand, regarding a pixel 24b having coordinates different from those of an intersection 10 on the calibration image 2, a plurality of inverse maps 25a corresponding to a plurality of correction vectors 21 are interpolated, with the result that an inverse map 25b corresponding to the pixel 24b is calculated. In this embodiment, four inverse maps 25a corresponding to four pixels 24a that are positioned closest around the pixel 24b are used. In accordance with a distance between the pixel 24b and each of the four pixels 24a positioned around the pixel 24b, the ratio of each inverse map 25a is determined, and the added ratios are calculated as an inverse map 25b corresponding to the pixel 24b. Based on the calculated inverse map 25b, the corrected coordinates of a pixel 26b corresponding to the pixel 24b are calculated.

In the interpolation of the inverse maps 25b in accordance with the pixel 24b on the sample image 23, for example, an interpolation method may be used in which regarding a pixel 24b in a certain range from a pixel 24a on the sample image 23, an inverse map 25a corresponding to the pixel 24a is used as it is. In addition to the interpolation method, various interpolation methods can be adopted. Further, a correction vector corresponding to a pixel other than the intersection 10 of the calibration image 2 may be interpolated by a plurality of correction vectors 21, and an inverse vector thereof may be used as an inverse map 25b corresponding to the pixel 24b on the sample image 23.

The CPU 101 overwrites pixels positioned in the coordinates of the calculated pixels 26a and 26b obtained after correction with the luminance values of the pixels 24a and 24b before the correction. Accordingly, the distortion of the sample image 23 is corrected. Here, the corrected distortion component is a component obtained by removing the rotational component and the translation component from all shape distortion components caused by the illumination optical system 302, the glass slide, the image-forming optical system 303, and the like.

Figure 15:
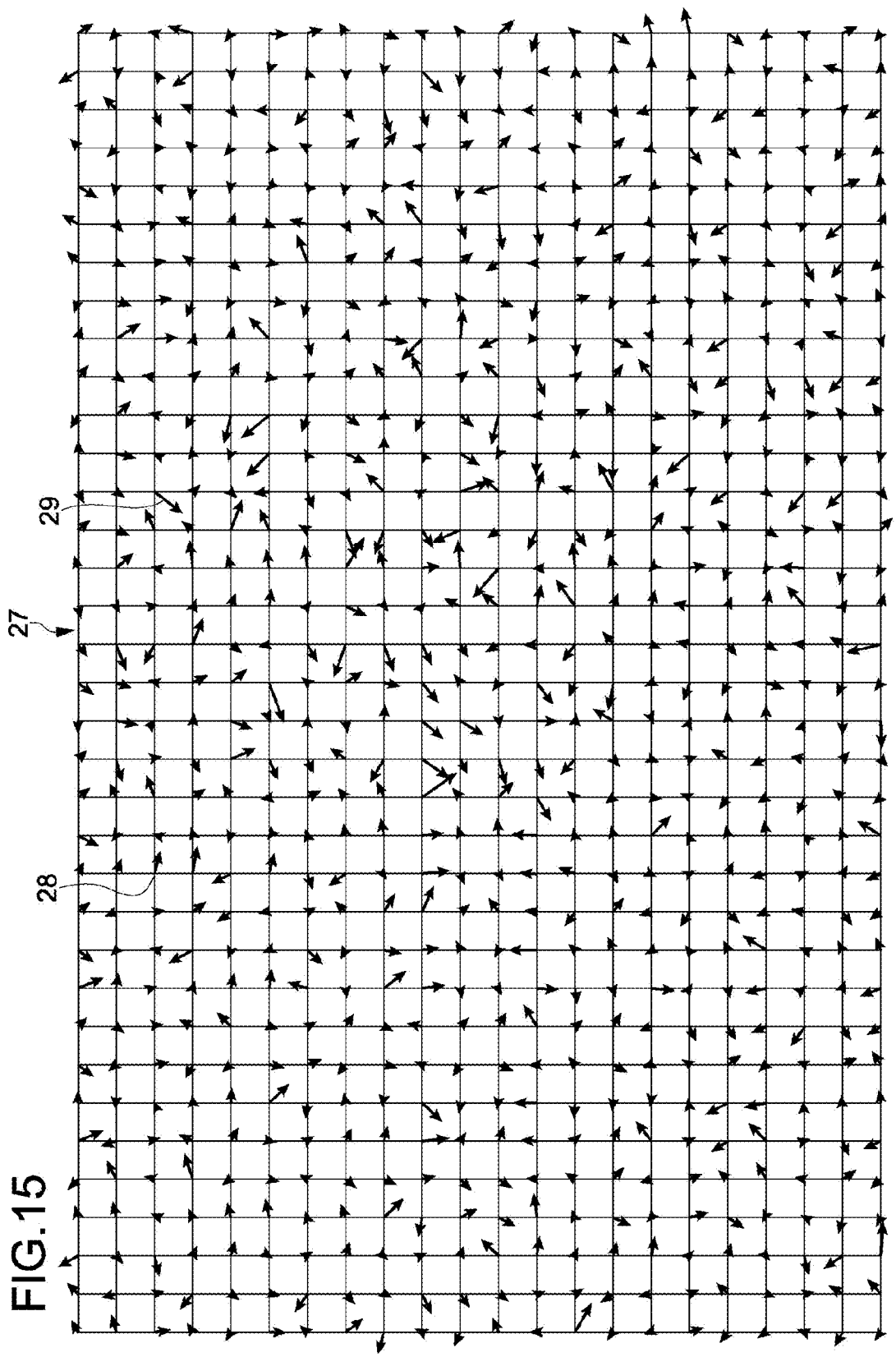
FIG. 15 is a diagram showing a comparison result with the theoretical checkered pattern at a time when the calibration image is corrected using the correction vector field shown in FIG. 13.

FIG. 15 is a diagram showing a comparison result with the theoretical checkered pattern 1' at a time when the calibration image 2 is corrected using the correction vector field 22.

Vectors 29 extending from respective intersections 28 on a corrected calibration image 27, which are shown in FIG. 15, each indicate an amount of a deviation from each intersection 5' of the theoretical checkered pattern 1'. When the deviation amount is calculated, a maximum deviation amount is 1.9 (pixels), and an average deviation amount is 0.6 (pixels). Further, there are found no regularity in the directions of the vectors 29 extending from the respective intersections 28. In other words, it is found that by the distortion correction processing according to this embodiment, complicated distortion having no regularity is corrected with a tolerance having an average deviation amount of 0.6 (pixels), that is, a tolerance of 1 (pixel) or less on the calibration image 2 having the size of 60×40 (Kpixels).

The mechanism of the optical system of the optical microscope 300 is complicated, and tolerances of some dozen times of assembling are superimposed. In addition, in the optical system, many optical systems that are not symmetrical with respect to the center of an optical axis, such as a mirror and a prism, are used. Therefore, complicated distortion is caused on the sample image 23 captured as described above. Further, in the imaging optical system having a low depth of field that is included in the optical microscope 300, light emitted from a sample is not parallel due to a radiation angle of light from the light source 301 or an illumination aperture and has a certain angle. In addition, an image of the sample is captured over glass, such as a glass slide, having a different refractive index. For that reason, there may be a case where shape distortion of an image that is not symmetrical with respect to the center of the optical axis, such as halation, is also caused at the same time. Therefore, it is difficult to correct distortion of the sample image 23 while using an expression that is based on a distance from the center of the distortion. Further, even when an expression for distortion correction is intended to be set as appropriate from a simulation value that is based on imaging-capturing conditions, it is difficult to perform distortion correction with high accuracy because there is a high possibility of occurrence of distortion that may be impossible to be simulated.

However, in the PC 100 serving as the information processing apparatus according to this embodiment, an image of a calibration subject including a checkered pattern 1 is captured and a calibration image 2 is generated. In addition, as standard pattern information on a luminance distribution of the calibration image 2, a function $z(x,y)$ representing a sinusoidally curved surface Z is generated. Then, by matching processing between a luminance value of each pixel of the calibration image 2 and a value of the function $z(x,y)$, an intersection 10 on the calibration image 2 is determined with high accuracy. Accordingly, the accuracy of a distortion vector field 11 and a correction vector field 22 that are calculated based on the intersection 10 of the calibration image 2 is also high. As a result, even when complicated distortion that is difficult to be predicted is caused in the sample image 23 captured by the imaging apparatus 200, the complicated distortion can be corrected with high accuracy. Accordingly, it is possible to improve a gray scale, a resolution, a dynamic range expansion, or color reproduction, or the like of the sample image 23.

In addition, in this embodiment, a component obtained by removing a translation component and a rotational component from a calculated distortion vector field 11 is calculated as a correction vector field 22. As shown in FIG. 2, the sample 305, an image of which is captured by the imaging apparatus 200, is placed on the sample stage 304. Therefore, distortion in a direction of an optical axis, that is, distortion of a depth component is not generated in the sample image 23. As a result, a translation component and a rotational component can be removed from the distortion vector field 11. Accordingly, a correction amount on the sample image 23 captured by the imaging apparatus 200 can be reduced, with the result that image correction with high accuracy is realized.

Further, in a case where a plurality of images obtained by capturing images of parts of one sample 305 are subjected to stitching processing, the distortion correction processing according to this embodiment is performed on the respective images. Since the translation component and the rotational component are removed from the distortion vector field 11 as described above, the translation component and the rotational component remain in the respective images. However, the translation component and the rotational component each having the same amount with respect to the respective images remain, and therefore the stitching processing is performed on the respective images adequately. Therefore, the distortion correction processing according to this embodiment is effective in the stitching processing in which image correction with high accuracy is requested because a sufficient effect can be produced.

Furthermore, in this embodiment, for example, a correction table of the correction vector field 22 under predetermined imaging-capturing conditions in which the light source 301, the illumination optical system 302, the image-forming optical system 303, and the like are determined is stored in the HDD 104 or the like. Therefore, when an image of a new sample is captured under the same imaging-capturing conditions, a calibration image 2 is captured anew. The correction vector field 22 is not necessary to be calculated, and a sample image can be corrected with high accuracy based on the correction table stored in the HDD 104. Accordingly, a processing time for the distortion correction processing can be shortened.

The correction table may be loaded in response to an instruction of a user, or may be automatically loaded. For example, in a case where the stitching processing as described above is performed, if the correction table is automatically loaded each time an image of each part of a sample is captured, the convenience of the user is improved.

(Second Embodiment)

An information processing apparatus according to a second embodiment will be described. In the following description, equivalents to various apparatuses or data used in the imaging system 400 described in the first embodiment are not descried or simply described.

Figure 16:
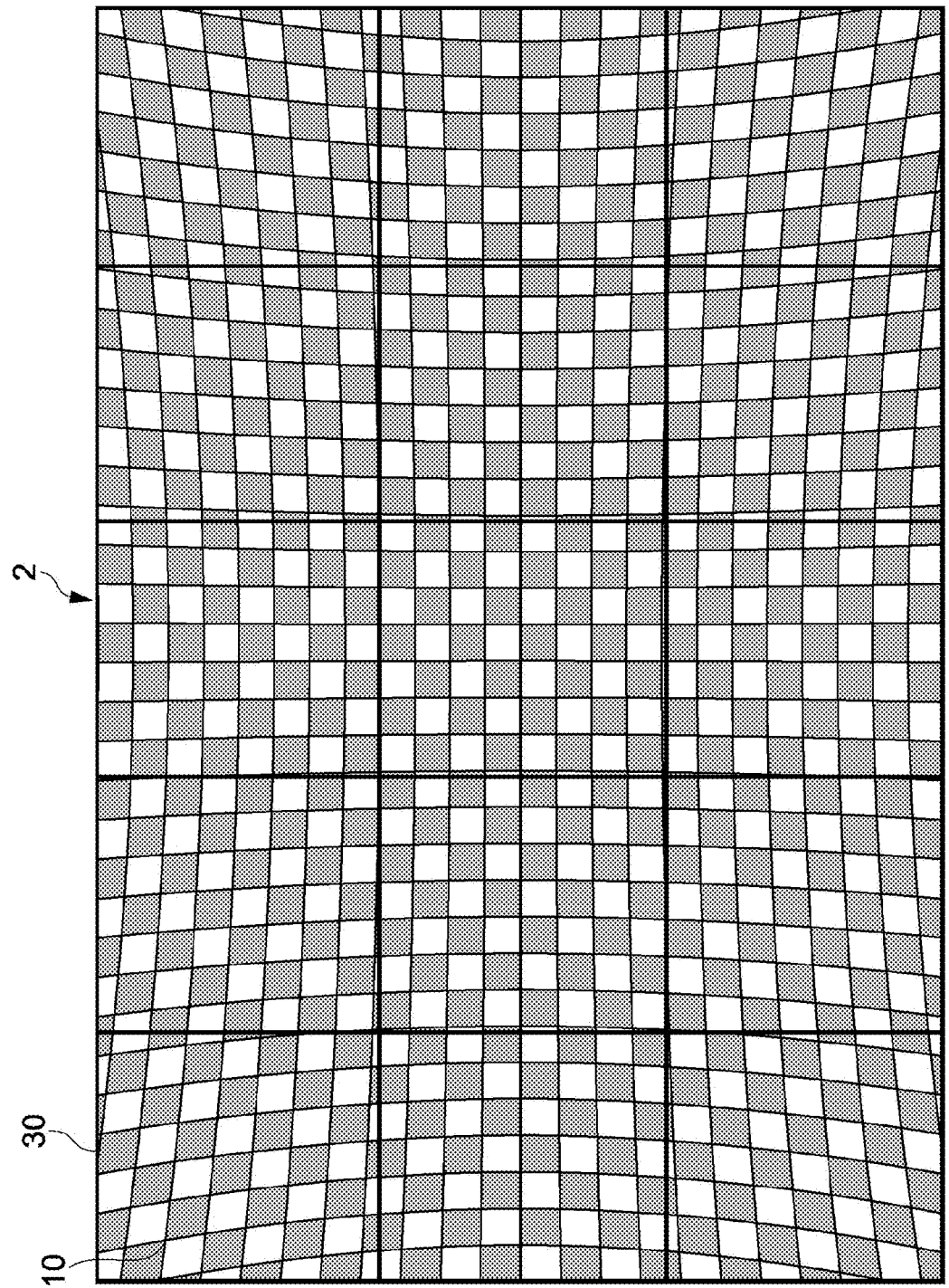
FIG. 16 is a diagram for explaining processing performed on a calibration image according to a second embodiment.

FIG. 16 is a diagram for explaining processing performed on a calibration image 2 according to this embodiment. In this embodiment, the CPU performs Fourier transform for each of divided areas 30 obtained by dividing the calibration image 2 into a plurality of areas. Then, a frequency having the largest intensity of a spectrum is calculated for each of the divided areas 30, and a function representing a sinusoidally curved surface is generated using the frequency. In each divided area 30, the CPU calculates the coordinates of the intersection 10 in the area by using the generated function.

In this manner, a function representing a sinusoidally curved surface is generated for each divided area 30 of the calibration image 2 having complicated distortion. Accordingly, an optimum function for the matching processing used for determining the coordinates of an intersection 10 can be generated. As a result, the coordinates of intersections 10 in the divided areas 30 can be determined with high accuracy.

The size and the number of divided areas 30 can be set as appropriate. After a necessary computing amount and computing speed, the determination accuracy of the coordinates of an intersection 10, and the like are taken into consideration, a predetermined size and number of divided areas 30 may be set. In addition, a plurality of divided areas 30 may be set so as to have overlapping areas therebetween, for example, so as to overlap each other by one pixel. Alternatively, only the divided areas 30 that include a predetermined area on the calibration image 2 may be subjected to Fourier transform, and a function representing a sinusoidally curved surface may be generated. The divided areas 30 that are not subjected to Fourier transform may be subjected to the matching processing with the function generated based on the divided areas 30 subjected to Fourier transform, and the coordinates of intersections 10 within the predetermined area may be determined. Accordingly, a processing time for the intersection extraction processing can be shortened.

The CPU generates the distortion vector field 11 shown in FIG. 10 based on the coordinates of the intersections 10 determined for each of the divided areas 30, and subsequently performs the alignment processing and the distortion correction processing as performed in the first embodiment.

The CPU may generate a distortion vector field for each divided area 30 and calculate a correction vector field in each divided area 30 based on the distortion vector field. The CPU divides a sample image captured by the imaging apparatus 200 into a plurality of divided areas so as to correspond to the divided areas 30 described above. Then, using a correction vector field generated for each divided area 30, the CPU performs the distortion correction processing for each divided area on the sample image. In this manner, the distortion correction is performed for each of the divided areas on the sample image, with the result that the loads on processing resources such as the CPU and the RAM of the PC are mitigated and a processing speed can be improved, even when a sample image having, for example, the size of 60×40 (Kpixels) and a huge amount of data is corrected.

The information processing apparatus according to each of the embodiments described above is used in, for example, a system that digitizes an image of a cell, a tissue, an organ, or the like of a living body, which is obtained by the optical microscope, in the field of medicine or pathology, for example, to examine the tissue or the like by a doctor or a pathologist or diagnose a patient based on the digitized image. However, the information processing apparatus is applicable to other fields in addition to this field.

In the embodiments described above, the PC is exemplified as the information processing apparatus. However, for example, by the imaging apparatus 200 shown in FIG. 1, part or all of the intersection extraction processing, the alignment processing, or the distortion correction processing may be performed. In this case, the imaging apparatus 200 and the PC 100 are used as the information processing apparatus according to the embodiments. Further, for example, a scanner apparatus having a function of an optical microscope, or the like may be used as an imaging apparatus including an optical microscope according to the embodiments, the imaging apparatus having the functions of the optical microscope 300, the imaging apparatus 200, and the PC 100 shown in FIG. 1.

Figure 17:
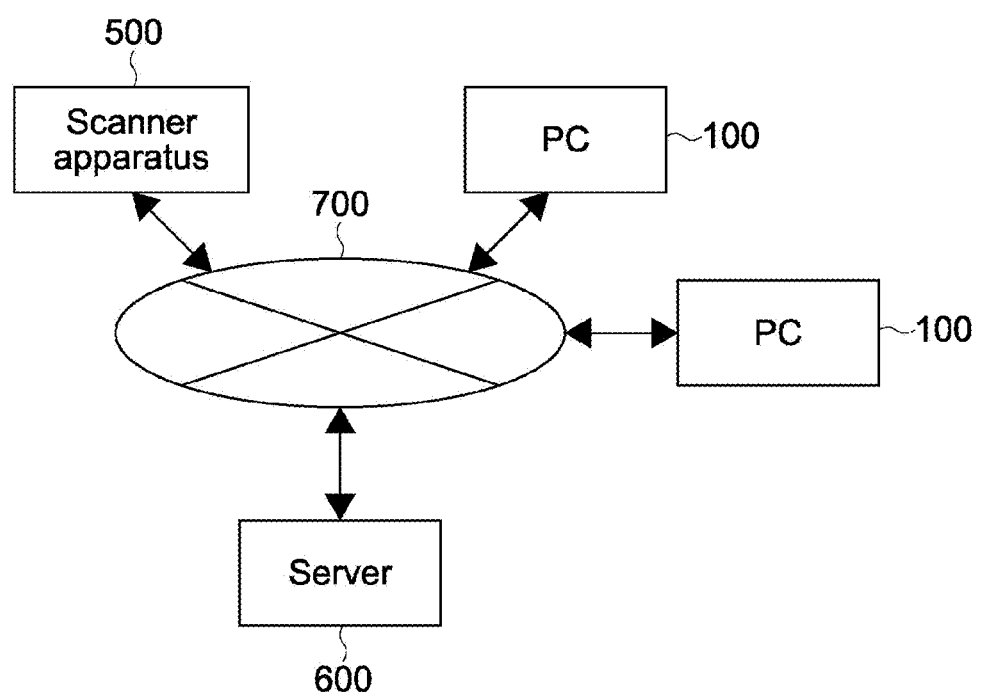
FIG. 17 is a diagram showing a structural example of an imaging system according to other embodiments.

In addition, as shown in FIG. 17, the Raw data of the calibration image or sample image generated by a scanner apparatus 500 used in an embodiment may be stored in a computer different from the PC 100 or the server 600, and the PC 100 that the user uses as a terminal apparatus may receive that Raw data by accessing those different computer and server 600. In this case, the PC 100 serving as a terminal apparatus and the server 600 may be connected via a network 700 such as LAN (Local Area Network) and WAN (Wide Area Network). Particularly, the telepathology or remote diagnosis can be realized with use of WAN.

In the first embodiment, as shown in FIG. 8, using a frequency having the largest intensity of a spectrum, which is calculated by performing Fourier transform on the calibration image 2 in the x-axis direction, a function $z(x,y)$ representing a sinusoidally curved surface Z is generated. However, a frequency having the largest intensity of a spectrum, which is calculated by performing Fourier transform on the calibration image 2 in the y-axis direction, may be used. Alternatively, as a function $z(x,y)$, the product of a sine wave of the frequency calculated in the x-axis direction and a sine wave of the frequency calculated in the y-axis direction may be used.

In the description above, the case where the intersection extraction processing and the alignment processing are performed in advance has been described. However, part or all of the intersection extraction processing and the alignment processing may be performed simultaneously with the distortion correction processing. In this case, a glass slide used for holding a sample may be provided with a calibration subject having a calibration pattern.

In the description above, a checkered pattern is used as a calibration pattern. Instead of the checkered pattern, for example, a dot pattern, an MTF (Modulation Transfer Function) pattern, and the like are used as the calibration pattern.

In the description above, the intersection extraction processing, the alignment processing, and the distortion correction processing are performed after the optical correction processing and the demosaic processing. However, part or all of the intersection extraction processing, the alignment processing, or the distortion correction processing may be performed before the optical correction processing and the demosaic processing.

In the description above, to determine an intersection of a calibration image, a correlation value between a luminance value of each pixel of the calibration image and a value of a function representing a sinusoidally curved surface is calculated. However, to determine an intersection, a calibration image and an image obtained by shifting the calibration image may be subjected to the matching processing. Further, for the matching processing for determining an intersection, algorithms such as a pattern recognition and a learning circuit may be used.

In the description above, the correction table of a correction vector field obtained after the alignment processing is performed is created. However, for example, a correction table of a distortion vector field obtained before the alignment processing is performed may be created, and the alignment processing may be performed on the read distortion vector field at a time when the distortion correction processing is performed. Further, a correction table in which an inverse vector of each vector of the correction vector field is stored as an inverse map may be created.

Further, as a correction table, a table in which the overall correction vectors corresponding to respective pixels of a sample image, which include the interpolated correction vectors, are stored may be created. Alternatively, the correction vector field may be stored as a correction table after being smoothed with the surrounding pixels. In addition, by performing Fourier transform and using an expression or a coefficient, a correction table may be created.

The correction vector field described above may be calculated for each R, G, or B with respect to the respective pixels of the sample image. Alternatively, the correction vector field may be calculated for each R, Gr, Gb, or B corresponding to a color filter.

Further, the correction table of the correction vector field may be created while the calibration processing is performed each time a Z position, an imaging position with respect to an observed area, an illumination optical system, an image-forming optical system, a sample, a sensor, an imaging apparatus, an image processing method, temperature, a field stop, an exposure time, an analog gain setting value, an exposure correction setting value, a chroma setting value, a magnification setting value, or the like is changed.

In the description above, all the correction vectors of the correction vector field are used, but the number of correction vectors to be used may be reduced so as to shorten the processing time or reduce a computing amount. For example, with respect to a plurality of pixels in a predetermined range, the same correction vector is assigned, with the result that the number of correction vectors used in the distortion correction processing may be reduced.

In the description above, a Raw data file containing Raw data of the calibration image and the sample image is created by the imaging apparatus 200 shown in FIG. 3. However, by the imaging apparatus 200, Raw data may be subjected to the image processing, or a Raw data file containing various types of data such as information for identify the imaging apparatus 200 and information for identify an imaging-capturing condition may be created. Further, the various types of data may be used for the intersection extraction processing, the alignment processing, or the distortion correction processing.

Further, the Raw data of each image, the correction table, or the sample image that has been subjected to the distortion correction processing described above may be used for obtaining statistical data, calibration data, or the like used at a time of the calibration processing or the distortion correction processing.

In the description above, an image of a subject having a checkered pattern is captured by the imaging apparatus and a calibration image is generated. However, it may be possible to apply illumination light emitted from a light source with a checkered pattern to a subject having 80% of a uniform gray color, for example, and capture an image of the subject in that state, to thereby generate a calibration image. In addition, a calibration image may be captured so that ideal distortion characteristics are obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a first storage means for storing coordinates of a plurality of luminance change points in which luminances are changed, in a calibration pattern that has a luminance distribution in which luminances are regularly changed in two axis directions orthogonal to each other;
a generation means for generating standard pattern information on a luminance distribution of a calibration image generated by capturing an image of the calibration pattern by an imaging means capable of capturing an image obtained by an optical microscope;
a determination means for determining coordinates of a luminance change point of the calibration image, the luminance change point corresponding to each of the plurality of intersections that correspond to boundaries between bright parts and dark parts in a checkered pattern, the plurality of intersections being luminance change point intersections of the calibration pattern, as coordinates of a correction luminance change point intersection, by matching processing between the luminance distribution of the calibration image and the generated standard pattern information;
a first calculation means for calculating a difference between the stored coordinates of the plurality of luminance change point intersections and the coordinates of the correction luminance change point intersections determined by the determination means in accordance with the plurality of luminance change point intersections, as a distortion vector field including a plurality of distortion vectors;
a second calculation means for calculating a component obtained by removing a translation component and a rotational component from the distortion vector field, as a correction vector field, wherein removing the translation component includes calculating an average vector of the plurality of vectors and subtracting the average vector from the distortion vector field; and
a correction means for correcting a shape distortion of an image captured by the imaging means by using the calculated correction vector field.

2. The information processing apparatus according to claim 1, further comprising
a second storage means for storing the correction vector field calculated by the second calculation means, wherein
the correction means corrects the shape distortion of the image by using the correction vector field stored by the second storage means.

3. The information processing apparatus according to claim 1, wherein
the generation means generates standard pattern information on luminance information of each of divided areas that are obtained by dividing the calibration image into a plurality of areas, and
the determination means determines the coordinates of the correction luminance change point intersections in each of the divided areas by matching processing between the luminance distribution of each of the divided areas and the standard pattern information generated for each of the divided areas.

4. The information processing apparatus according to claim 1, wherein
the generation means performs Fourier transform on the calibration image to calculate a frequency having a largest intensity of a spectrum in each of the two axis directions and generate the standard pattern information by using at least one of the calculated frequencies of the two axis directions, and
the determination means calculates a correlation value between a luminance value of each pixel of the calibration image and the standard pattern information.

5. An information processing method executed by an information processing apparatus, the method comprising:
storing, by the information processing apparatus, coordinates of a plurality of luminance change points in which luminances are changed, in a calibration pattern that has a luminance distribution in which luminances are regularly changed in two axis directions orthogonal to each other;
generating, by the information processing apparatus, standard pattern information on a luminance distribution of a calibration image generated by capturing an image of the calibration pattern by an imaging means capable of capturing an image obtained by an optical microscope;
determining, by the information processing apparatus, coordinates of a luminance change point of the calibration image, the luminance change point corresponding to each of the plurality of intersections that correspond to boundaries between bright parts and dark parts in a checkered pattern, the plurality of intersections being luminance change point intersections of the calibration pattern, as coordinates of a correction luminance change point intersection, by matching processing between the luminance distribution of the calibration image and the generated standard pattern information;
calculating, by the information processing apparatus, a difference between the stored coordinates of the plurality of luminance change point intersections and the coordinates of the correction luminance change point intersections determined by the determination means in accordance with the plurality of luminance change point intersections, as a distortion vector field including a plurality of distortion vectors;
calculating, by the information processing apparatus, a component obtained by removing a translation component and a rotational component from the distortion vector field, as a correction vector field, wherein removing the translation component includes calculating an average vector of the plurality of vectors and subtracting the average vector from the distortion vector field; and correcting, by the information processing apparatus, a shape distortion of an image captured by the imaging means by using the calculated correction vector field.

6. A non-transitory computer readable storage medium storing a computer program for causing an apparatus to:

store coordinates of a plurality of luminance change points in which luminances are changed, in a calibration pattern that has a luminance distribution in which luminances are regularly changed in two axis directions orthogonal to each other;

generate standard pattern information on a luminance distribution of a calibration image generated by capturing an image of the calibration pattern by an imaging means capable of capturing an image obtained by an optical microscope;

determine coordinates of a luminance change point of the calibration image, the luminance change point corresponding to each of the plurality of intersections that correspond to boundaries between bright parts and dark parts in a checkered pattern, the plurality of intersections being luminance change point intersections of the calibration pattern, as coordinates of a correction luminance change point intersection, by matching processing between the luminance distribution of the calibration image and the generated standard pattern information;

calculate a difference between the stored coordinates of the plurality of luminance change point intersections and the coordinates of the correction luminance change point intersections determined by the determination means in accordance with the plurality of luminance change point intersections, as a distortion vector field including a plurality of distortion vectors;

calculate a component obtained by removing a translation component and a rotational component from the distortion vector field, as a correction vector field, wherein removing the translation component includes calculating an average vector of the plurality of vectors and subtracting the vector from the distortion vector field; and correct a shape distortion of an image captured by the imaging means by using the calculated correction vector field.

7. An imaging apparatus comprising:

an optical microscope;

an imaging means capable of capturing an image obtained by the optical microscope;

a storage means for storing coordinates of a plurality of luminance change points in which luminances are changed, in a calibration pattern that has a luminance distribution in which luminances are regularly changed in two axis directions orthogonal to each other;

a generation means for generating standard pattern information on a luminance distribution of a calibration image generated by capturing an image of the calibration pattern by the imaging means;

a determination means for determining coordinates of a luminance change point of the calibration image, the luminance change point corresponding to each of the plurality of intersections that correspond to boundaries between bright parts and dark parts in a checkered pattern, the plurality of intersections being luminance change point intersections of the calibration pattern, as coordinates of a correction luminance change point intersection, by matching processing between the luminance distribution of the calibration image and the generated standard pattern information;

a first calculation means for calculating a difference between the stored coordinates of the plurality of luminance change point intersections and the coordinates of the correction luminance change point intersections determined by the determination means in accordance with the plurality of luminance change point intersections, as a distortion vector field including a plurality of distortion vectors;

a second calculation means for calculating a component obtained by removing a translation component and a rotational component from the distortion vector field, as a correction vector field, wherein removing the translation component includes calculating an average vector of the plurality of vectors and subtracting the average vector from the distortion vector field; and a correction means for correcting a shape distortion of an image captured by the imaging means by using the calculated correction vector field.

8. An information processing apparatus comprising:

a first storage section configured to store coordinates of a plurality of luminance change points in which luminances are changed, in a calibration pattern that has a luminance distribution in which luminances are regularly changed in two axis directions orthogonal to each other;

a generation section configured to generate standard pattern information on a luminance distribution of a calibration image generated by capturing an image of the calibration pattern by an imaging section capable of capturing an image obtained by an optical microscope;

a determination section configured to determine coordinates of a luminance change point of the calibration image, the luminance change point corresponding to each of the plurality of intersections that correspond to boundaries between bright parts and dark parts in a checkered pattern, the plurality of intersections being luminance change point intersections of the calibration pattern, as coordinates of a correction luminance change point intersection, by matching processing between the luminance distribution of the calibration image and the generated standard pattern information;

a first calculation section configured to calculate a difference between the stored coordinates of the plurality of luminance change point intersections and the coordinates of the correction luminance change point intersections determined by the determination section in accordance with the plurality of luminance change point intersections, as a distortion vector field including a plurality of distortion vectors;

a second calculation section configured to calculate a component obtained by removing a translation component and a rotational component from the distortion vector field, as a correction vector field, wherein removing the translation component includes calculating an average vector of the plurality of vectors and subtracting the average vector from the distortion vector field; and a correction section configured to correct a shape distortion of an image captured by the imaging section by using the calculated correction vector field.

* * * * *